Nov. 8, 1966 B. L. BAILEY 3,284,372
APPARATUS AND PROCESS FOR CONTINUOUSLY MAKING
BAKED AND GRAPHITIZED CARBON BODIES
Filed Sept. 14, 1965 14 Sheets-Sheet 10

Nov. 8, 1966 — B. L. BAILEY — 3,284,372
APPARATUS AND PROCESS FOR CONTINUOUSLY MAKING BAKED AND GRAPHITIZED CARBON BODIES
Filed Sept. 14, 1965 — 14 Sheets-Sheet 11
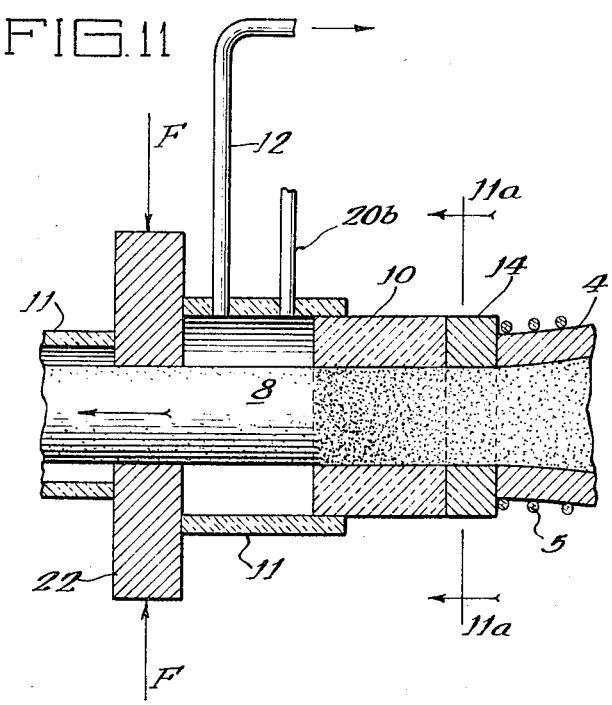
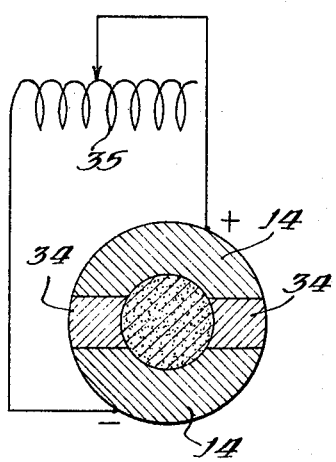
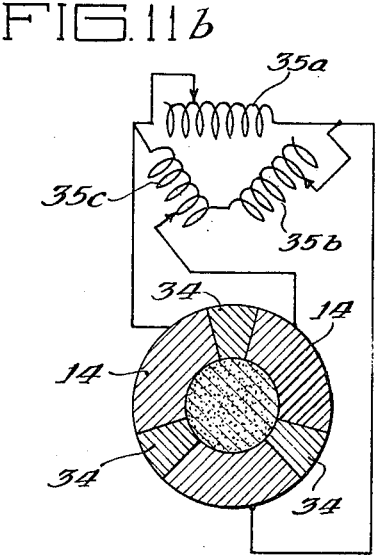
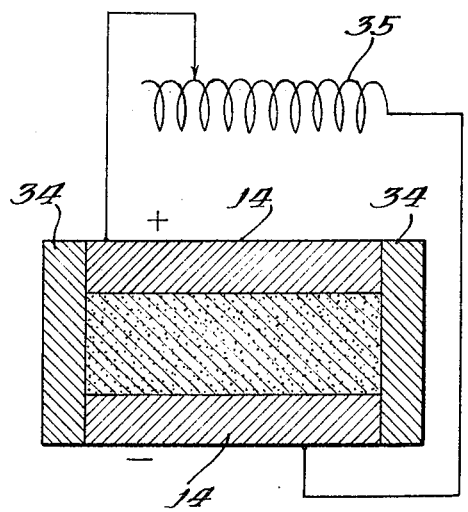

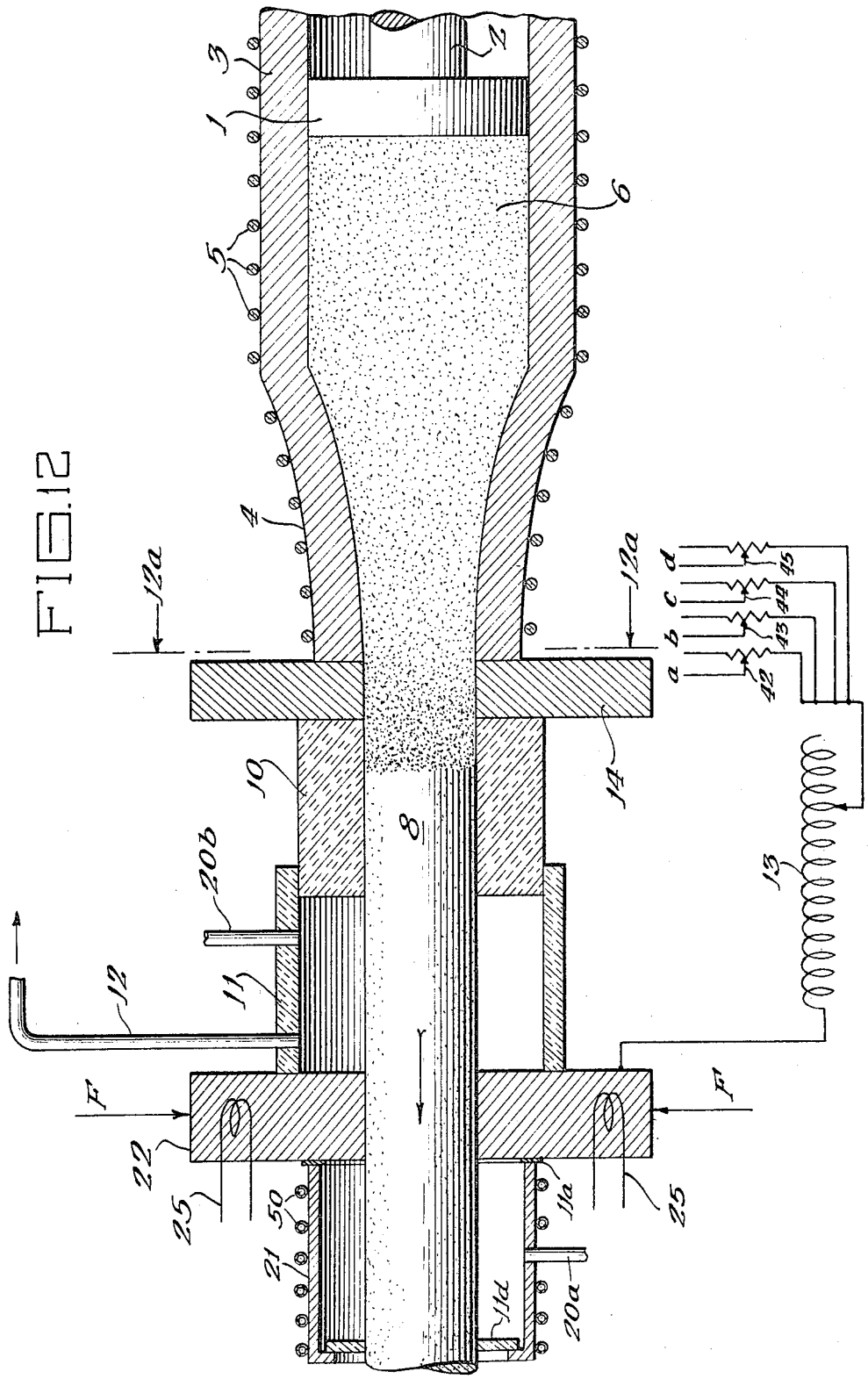

Nov. 8, 1966 B. L. BAILEY 3,284,372
APPARATUS AND PROCESS FOR CONTINUOUSLY MAKING
BAKED AND GRAPHITIZED CARBON BODIES
Filed Sept. 14, 1965 14 Sheets-Sheet 13

United States Patent Office 3,284,372
Patented Nov. 8, 1966

3,284,372
APPARATUS AND PROCESS FOR CONTINUOUSLY MAKING BAKED AND GRAPHITIZED CARBON BODIES
Bruce L. Bailey, Lewiston, N.Y., assignor to Great Lakes Carbon Corporation, New York, N.Y., a corporation of Delaware
Filed Sept. 14, 1965, Ser. No. 490,155
26 Claims. (Cl. 252—502)

This is a continuation-in-part of application Serial No. 271,673 filed April 9, 1963, now abandoned.

This invention relates most specifically to novel methods and apparatus for producing either baked or graphitized carbon bodies continuously, and to the baked and/or graphitized bodies thereby produced. The invention further relates to method and apparatus for producing such baked or graphitized bodies while simultaneously greatly reducing the time and costs normally required to produce such bodies of corresponding size, and while also, at the same time, producing bodies having structure and properties far superior to those obtainable by conventional techniques. In its broadest aspect, the invention relates to novel process and apparatus for applying electrothermal energy to any conductive compositions, such as discussed hereinafter, and to the resultant products.

Present commercial practices in greatest general use for making baked bodies normally involve several independent operations including: molding or extruding a carbonaceous mass; then, in a separate operation, heating the formed mass, while it is surrounded by a packing material, in a gas fired baking furnace for several days in order to bake it; and then cooling the baked body over a period of several more days prior to removing it from the furnace. If graphitized bodies are desired, the cooled, baked pieces are conventionally then heated in a separate electrically heated graphitizing furnace following a similar procedure and employing heating and cooling cycles each requiring several days.

While other techniques for making baked or graphitized carbon bodies are known, such as described in the Balaguer patent U.S. 3,001,237, none are believed to be currently employed on a scale approaching the conventional commercial practices outlined above, nor are they anticipatory of this invention.

The Balaguer process involves placing a suitable carbonaceous material in a mold, and passing an electrical current through the material while subjecting it to a high mechanical pressure until the carbonaceous material is carbonized or baked. The process is a batch operation, and the electrical resistance of the carbonaceous mass being baked is rather high at the start of the cycle and then decreases rapidly to a level several orders of magnitude lower. The baked material is cooled in place while stationary in the mold and is then removed therefrom. The patentee also indicates that it is possible to heat the baked products to graphitizing temperatures within the mold prior to cooling them; but recognizes that it may be desirable to carry out graphitization in a separate operation.

The process of the present invention (which is described hereinafter), as compared to present commercial practices is cheaper, produces a more uniform product and one requiring little or no final machining, is capable of producing articles having properties unattainable by present conventional means, reduces the time necessary to process an article, is capable of resulting in greatly reduced inventories and can be carried out by means requiring a much smaller capital investment.

In contrast to Balaguer's process, the process of the present invention is continuous or substantially continuous in nature as compared to a batch type operation. This contrast holds both as to the heating of the material through the baking and graphitizing phases and to its cooling as well.

During start-up of the process, the electrical resistance of the carbonaceous mass in the baking circuit is rather high and varies. However, after steady state conditions are established, because of the continuous nature of the process the electrical resistance of the carbonaceous mass in the baking zone remains essentially constant and at a relatively high level. Also, the specific resistance of the carbonaceous mass undergoes a decrease such as from about 10 to 1 to about 500 to 1 along the path of feed as the material changes from the green state to the baked state, yet the specific resistance of the carbonaceous mass in any portion of the baking circuit remains substantially constant with time.

The reasons for these advantages (and distinctions), the attainment of which advantages are also the objects of this invention, will become clearer upon a reading of the invention described hereinafter. Additional objects and advantages (and distinctions) will also become evident to those skilled in the art after a reading of the specification and the accompanying claims.

It is a finding of this invention that by utilizing novel techniques of this invention, baked and/or graphitized carbon bodies may be produced on a continuous basis and in a considerably different manner from any methods heretofore known for making such bodies. It is an additional finding that this considerably different continuous process is made possible by heating the carbonaceous mass in a particular manner, to be described in detail hereinafter, and that by doing this, the objects and advantages previously enumerated are achieved.

Although the invention relates most specifically to the continuous baking and/or graphitizing techniques employed (and to the articles produced thereby), regardless of whether some consolidation or forming of the conductive composition or the green carbonaceous mass being processed is carried out by pre-molding or pre-slugging or pre-extruding operations, etc., at least some consolidation of the conductive composition or the carbonaceous mass is also carried out in a substantially continuous manner while the articles are produced. This is accomplished by applying an axial mechanical force against one (the rearward) end of the green composition or carbonaceous mass, and restraining forces applied against the composition or mass, after it has been heated and become rigid and while the composition or carbonaceous mass is permitted to move through the apparatus. Closely coordinated with this portion of the consolidation step (which maintains the structural integrity of the mass being heated and which is continuous in nature) is the heating technique employed to heat the mass. As the green electrically conductive composition or green electrically conductive carbonaceous mass (which is usually a pre-heated loose extrudable mix, or pre-heated, pre-formed "slugs," etc.) passes through the final consolidating area, or the final phase of the consolidation step, it is in a plastic-like condition, thereby enabling or facilitating its conformity with the cross-sectional shape of the apparatus in that area. This cross-sectional shape of the mass may be varied such as circular, irregular, square, or rectangular, depending upon the cross-sectional shape of the chamber. As will become clearer hereinafter, it may also be annular with one or more channels if a mandrel or mandrels are employed in the apparatus or process.

Preliminary heating of the green electrically conductive carbonaceous mass is usually desirable and may be carried out in several ways such as by employing a freshly prepared hot, loose mix or by surrounding a mud chamber and/or a forming die with heating coils or hot gases.

However, after such general pre-treatment and while the mass is being forced and moving through the apparatus, it is then heated in a very specific manner, utilizing a closed electrical circuit in which said green electrically conductive composition or green electrically conductive carbonaceous mass is a resistance element in said circuit. Because of the nature and/or types of materials which are employed in the process, this heating step renders them rigid and self-supporting. In the case of processing a green carbonaceous mass, this heating step also causes the evolution of substantial amounts of volatiles and also a carbonization of the green mass and of any binders contained in same. Before the green conductive composition or green carbonaceous mass reaches this state of rigidity, however, it passes through a "plastic-like" or soft, or melted-like condition and, therefore, high-temperature resistant, electrically non-conductive means are provided to support the mass during its transition from the green to the rigid state, thereby substantially preserving the form it assumed in the final consolidating area.

Also essential in the process is the application of a restraining, compressive force against the mass (conveniently transmitted through the periphery of the baked portion thereof), as the mass is being processed through the apparatus, which force tends to oppose the axial movement of the heated mass through the apparatus. Alternatively, or additionally, frictional drag or restraint may be exerted upon the graphitized portion of the mass and/or against the forward end of the mass. The total amount of this "back" pressure or reverse thrust employed is variable and can be applied in different ways, as is obvious from the foregoing and as will become more evident hereinafter, but in any case is not so great as to stop the movement of the mass through the apparatus, which movement is substantially continuous in nature; nor so low as to prevent the formation of a sound structure in the mass being processed and heat treated. A more detailed discussion of this restraining force or "back" pressure and of the importance of same is set forth hereinafter.

A complete understanding of the invention will be facilitated by a review of the drawings wherein.

Figure 2:
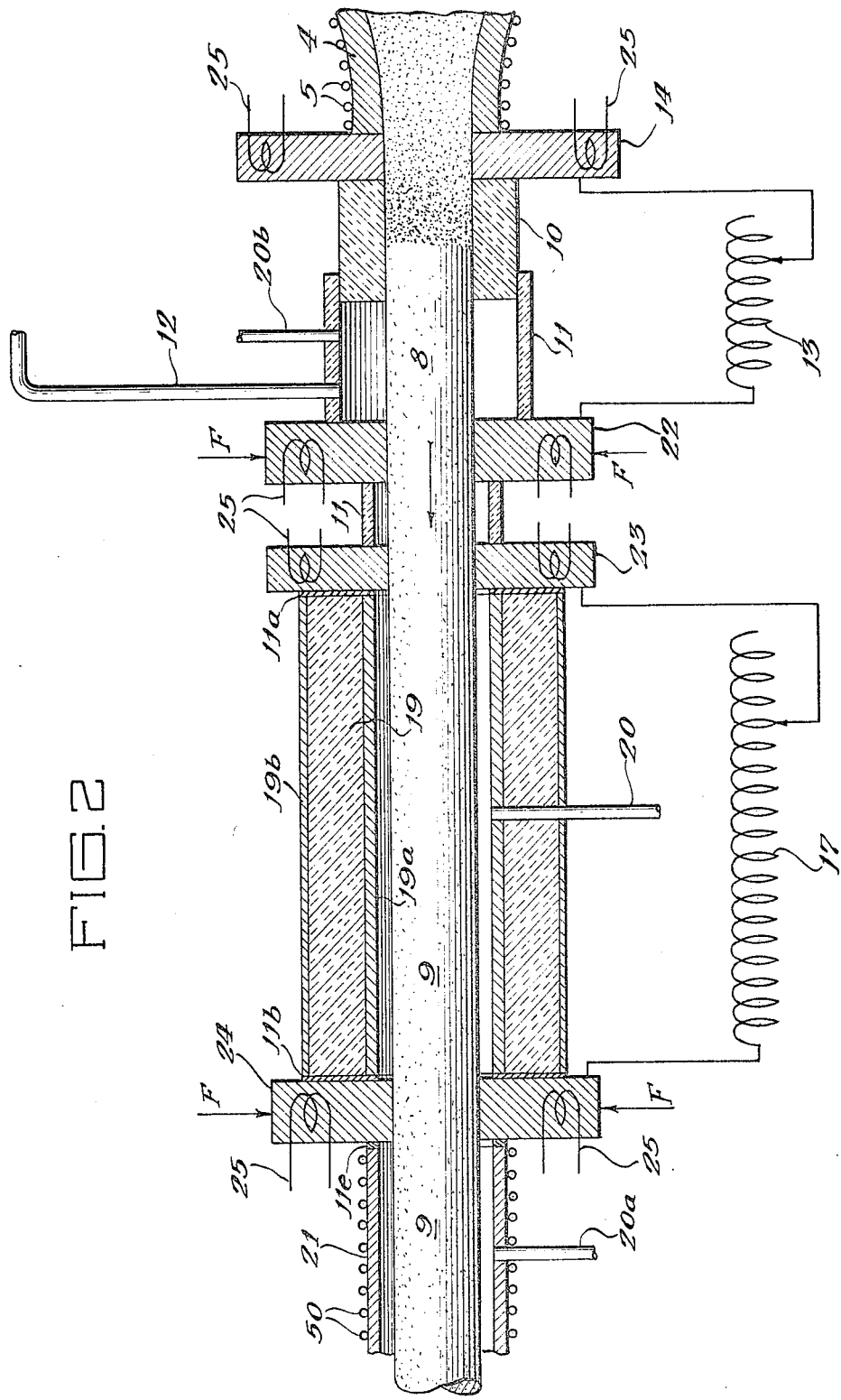
FIGURE 2 is a view similar to that of FIG. 1 but employing independent baking and graphitizing power contacts, the baking power contact also functioning to provide the back pressure against the movement of the mass.
Figure 3:
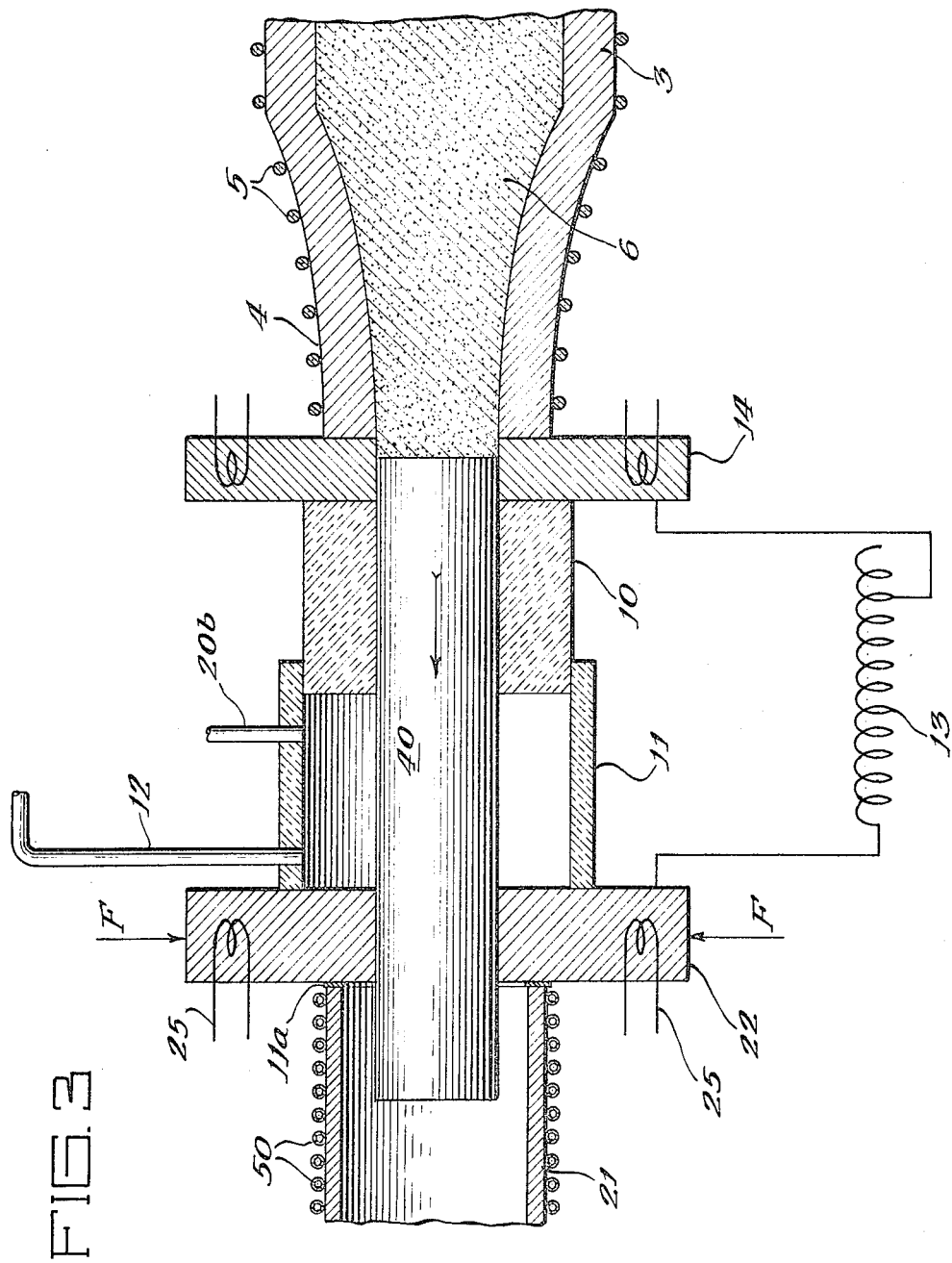
FIGURE 3 is a vertical cross-sectional view of the apparatus of FIG. 2 but modified to process the mass only through the baking step. This figure also indicates a typical arrangement for starting up the apparatus or process and the positioning of a "starter plug."
Figure 10:
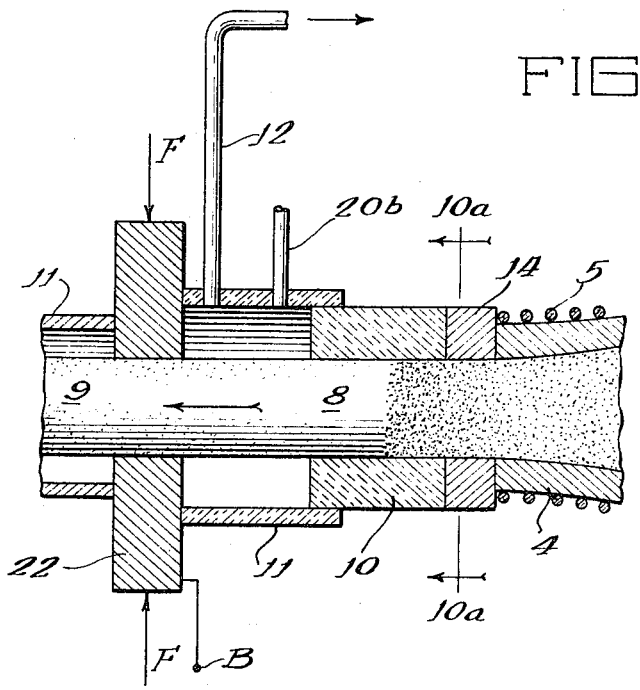
Figures 10A, 10B:
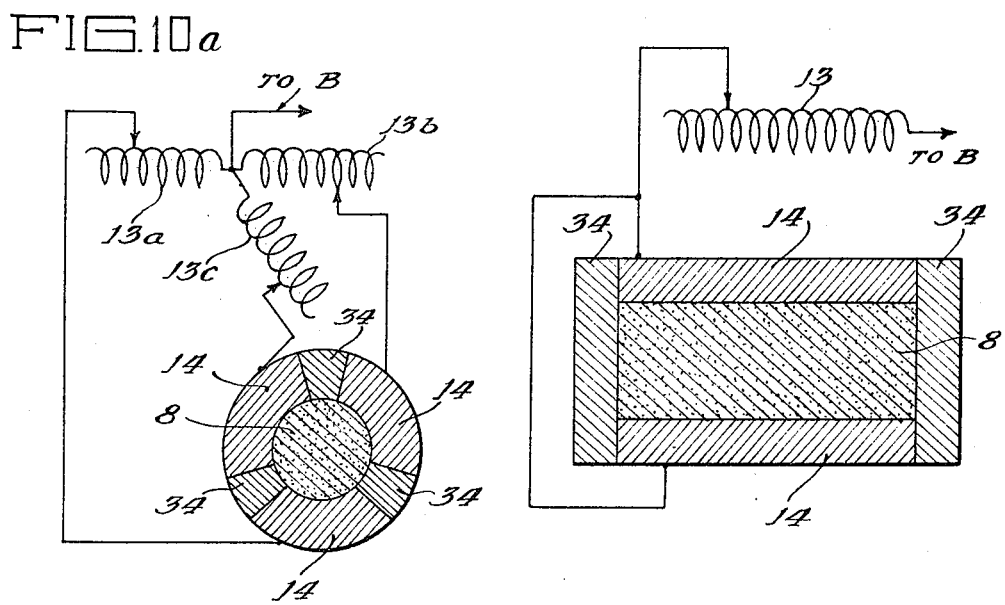
Figure 12A:
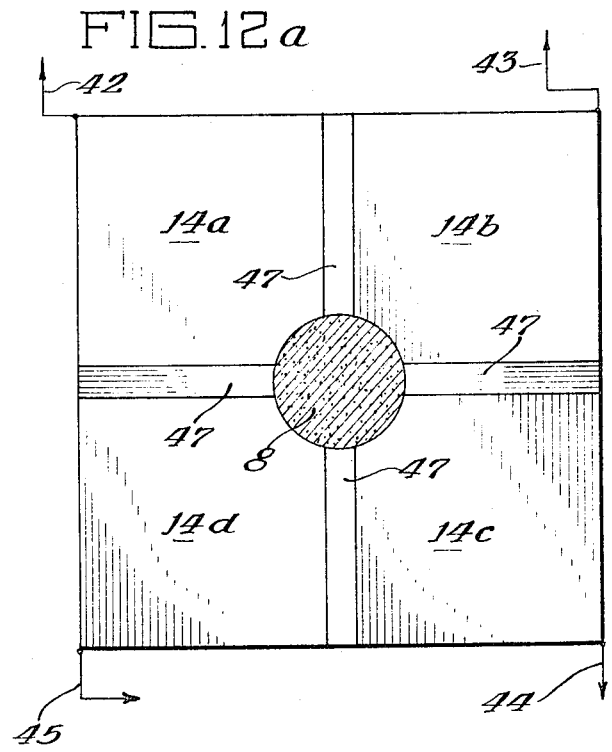
Figure 13:
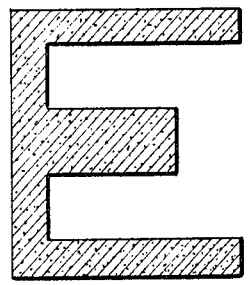
Figure 14:
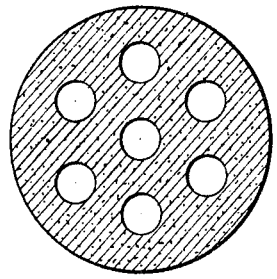
Figure 15:
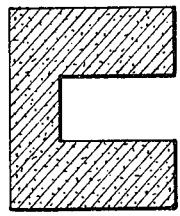
Figure 16:
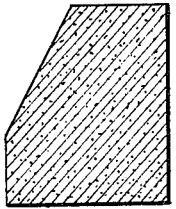
Figure 17:
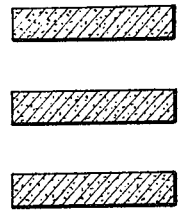
Figure 18:
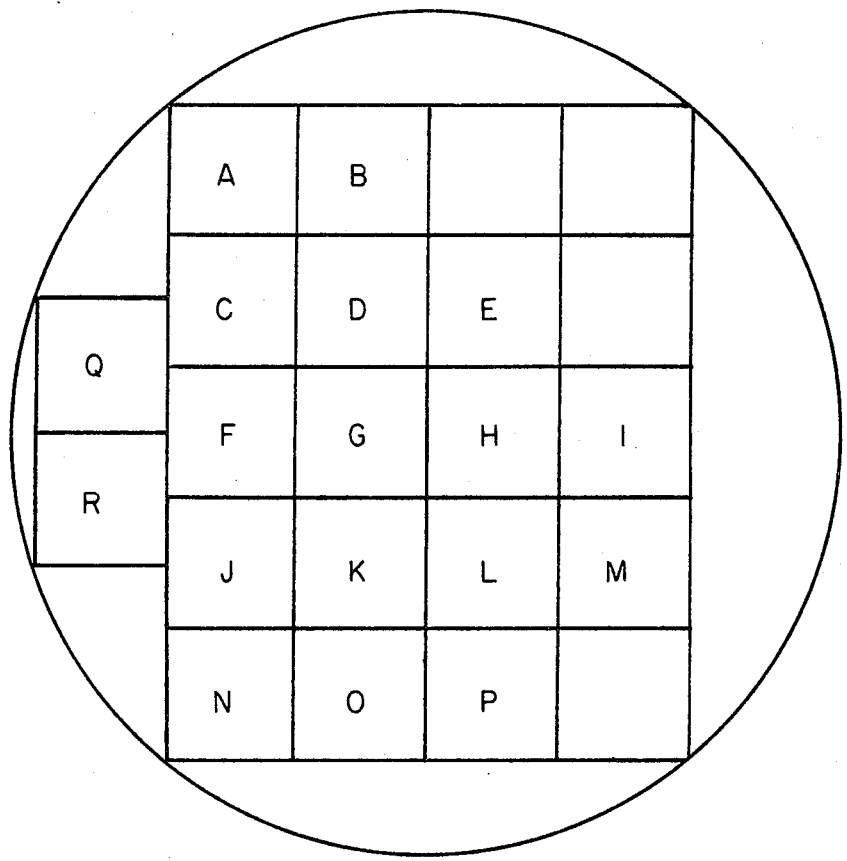

FIGURE 10 is a broken sectional of an apparatus similar to that of FIG. 2 but employing different types of "green" power contacts, said types of "green" power contacts being shown in more detail in sectional views 10a and 10b, taken through the line 10a—10a of FIGURE 10, the flow of current through the carbonaceous mass in each case being substantially axial with respect to the stock being baked; but also including some current in the transverse direction; that is, between segments in FIGURES 10a and 10b. These figures also show that the mass being processed may have a circular or a rectangular cross-sectional shape (or square, etc.), depending upon the shape of the extrusion die and mud chamber;

FIGURES 11, 11a, 11b and 11c correspond to FIGS. 10, 10a and 10b but schematically show electrical circuits in which the current flow is in a substantially radial or transverse direction with respect to the axis of the moving carbonaceous mass, or with respect to the direction of feed of the stock being processed;

FIGURE 12 is a vertical sectional view of an apparatus similar to that of FIG. 3, employing also a segmented power plate (FIG. 12a) and associated electrical circuitry adapted to provide varying electrical currents to the carbonaceous mass at a plurality of peripheral or perimetrical contacts. Such an arrangement can obviously be readily adapted to or employed with the apparatuses shown in the other figures;

FIGURES 13, 14, 15 and 16 illustrate but a few of the irregular, integral cross-sectional shapes of baked and/or graphitized materials which may be produced in accordance with the invention;

FIGURE 17 illustrates that the mass which is formed and heat-treated may be divided and shaped into a plurality of products, rather than into a single integral shape; and FIGURE 18 illustrates the uniformity of the products produced by this invention, and is referred to with reference to Example XII and Table 1.

Figure 1:
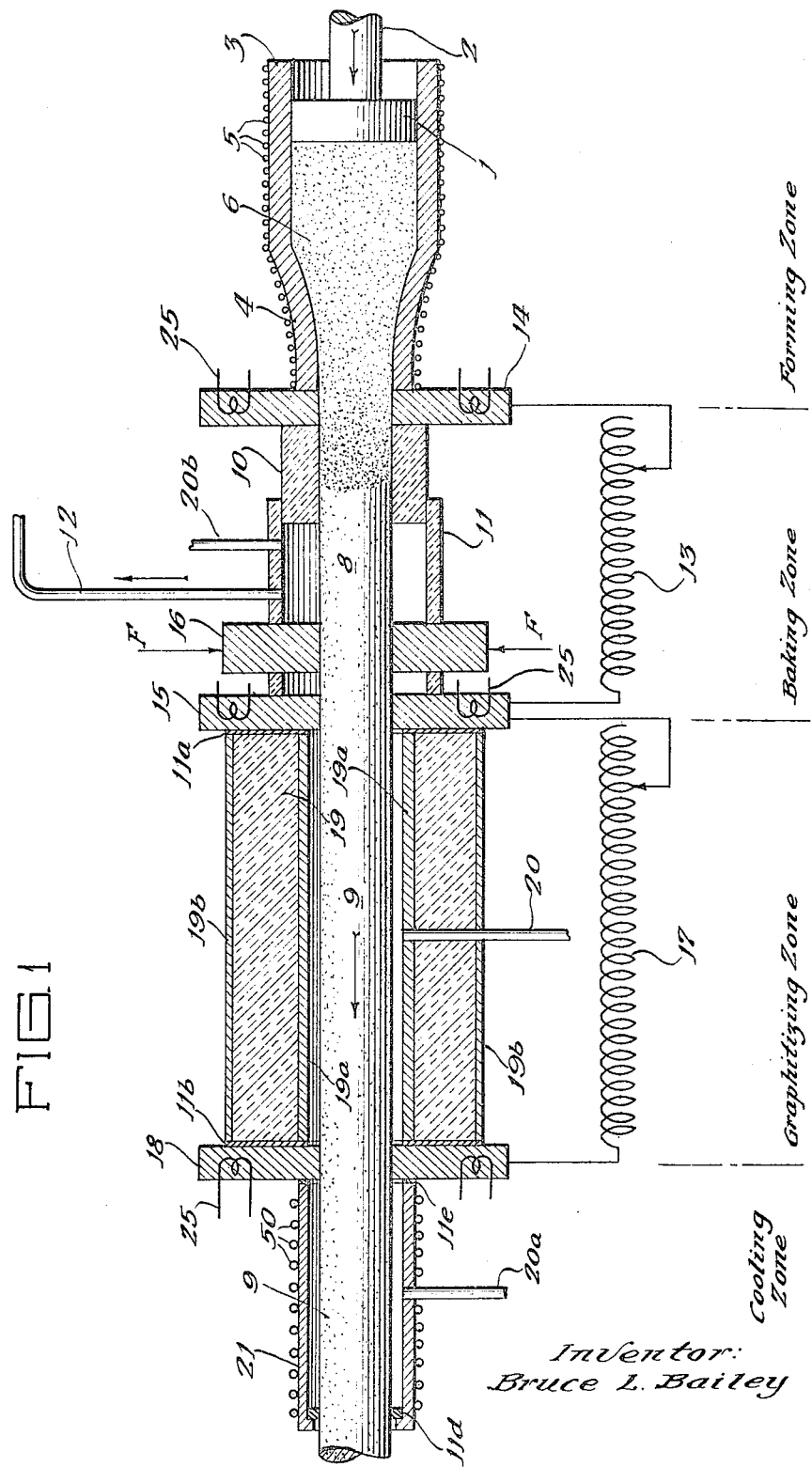
FIGURE 1 is a vertical cross-sectional view of the apparatus, shown partly also schematically, wherein a combined bake and graphite power contact is employed, with an independent "friction brake" for back pressure (back pressure is indicated by "F")

Referring now to these figures in more detail and describing these in relation to the apparatuses and processes of this invention:

FIGURE 1, which is demonstrative of most of the general features of the process and apparatus of the invention, may be considered as depicting four general zones, namely a forming zone, a baking zone, a graphitizing zone and a cooling zone. It should be noted that the point at which the "back" pressure "F" is applied is not part of the forming zone. The forming zone includes a piston 1, a piston rod 2 for driving the piston, a mud chamber 3 and a reducing section 4. Chamber 3 and section 4 together comprise an extrusion die. (As a general matter the extrusion die can be of almost any shape. It can have a reducing section, or an expansion section, or be of constant cross-section such as circular or rectangular.) An appropriate green electrically conductive composition which can become rigid upon being heated such as, for example, loose extrudable carbonaceous mix of proper apparent density may be fed into said zone, or the feed may be pre-extruded or pre-molded, shaped slugs (viz. preforms in the green state), etc. Surrounding the extrusion die are heating coils 5 which maintain or increase the temperature of the green carbonaceous mass 6 which is periodically inserted into said die and which is substantially constantly urged or forced into the baking zone by the piston 1. As the mass is forced through the apparatus it undergoes several changes in its transition to the baked form and to the graphitized form. Although it is difficult to define exactly where each of these changes begins and ends it may generally be stated that the mass changes from a green unbaked state 6, either in loose mixture form or contiguous, compacted slug form, to an integral, uniformly consolidated, rigid or baked carbon state 8, and then to the graphitized state 9, or a state of considerably less electrical resistance than the baked state. All of these changes in the carbonaceous mass are effected in a very short period of time, with part of the mass being processed undergoing one type of change, viz. from green through solidification, to rigid and baked, and another part changing from baked to graphitized, and all of this occurring simultaneously with respect to different given portions of the same carbonaceous mass.

The system which is employed to effect these changes is of a very specific nature, particularly the over-all arrangement for changing the electrically conductive green carbonaceous mass to the baked state, or in the broader aspect of the invention, the arrangement for applying electrothermal energy to the electrically conductive composition. This is accomplished by heating the mass or conductive composition electrically (resistive heating) by making the moving mass itself a resistance element in the electrical circuit which is employed to heat it and by passing a current through said mass while it is moving, said current being made to flow by applying a voltage across said mass by means of electrical conductors in direct contact with said moving mass. For example, in FIGURE 1, the electrical circuit for the baking zone comprises a secondary transformer winding 13, power terminal and contact 14 which is so positioned that it is in direct contact with the carbonaceous mass while it is in the green state, the carbonaceous mass between power contacts 14 and 15 in stages 6 and 8 as previously described, and power terminal and contact 15, which is in direct contact with the carbonaceous mass which has been substantially baked and become rigid. Also, in this arrangement because of the substantially continuous movement of the mass through the apparatus, a constant condition exists, i.e., one power terminal (14) will always be in contact with very high electrical resistance (relatively speaking) green mass, and one power terminal (15) will always be in contact with considerably lower electrical resistance baked mass. It will also be noticed that while the carbonaceous mass within this electrical circuit will at any instant constitute a non-uniform resistance because it is composed of material of widely different resistance characteristics (e.g., that of stage 6 material, that of stage 8 material and that of material intermediate between these two extremes), its total or over-all resistance remains substantially constant during the process. These relationships hold true for many of the process and apparatus variations which may be employed in the present invention; viz., wherever the electric current flow is substantially axial. Where the electric current flow is substantially radial or transverse, the total over-all resistance of the mass between the power terminals is also substantially constant but the two power terminals themselves are each in contact with material of essentially the same characteristics.

Also important in the baking step is provision for escape of the volatiles which are driven off from the mixtures being baked (if they are of such a nature that they evolve gases when heated) and provision for effecting considerable consolidation or compacting of the mass during its transition from green to bake. The carbonaceous mixes to be baked typically comprise mixtures of a carbonaceous or carbon aggregate such as graphite particles or calcined petroleum coke particles and a pitch binder. Upon heating and baking, the binder decomposes with part of it being driven off and part of it being converted to carbon within the mix. In FIGURE 1 the volatiles are vented in the direction of feed and escape through exit means 12. These volatiles may be vented to atmosphere or may be collected for further processing. Friction brake 16, in the apparatus illustrated in FIGURE 1 exerts a perimetrical or peripheral frictional drag against the body being processed (but only after the body has previously been formed and become rigid). The "drag" which it exerts is not of an amount which will stop the motion of the mass imparted by piston 1 but is sufficient to effect considerable counterforce against said motion. The result is the production of high density baked carbon bodies of low porosity and low permeability. (Other results or effects of this "back" pressure also follow and these are discussed hereinafter.)

Another important factor in the process is the providing of suitable construction materials such as for the support 10 in the transition portion of the baking zone and for the spacer 47 in the segmented power plate described hereinafter. Supporting means 10 functions to support the mass while it is moving and during its transition to the rigid condition. The spacer and the support must be capable of resisting deterioration at the particular temperature employed and must be or contain an electrical insulator at that temperature. The materials used for each of these purposes may frequently be the same, and may be used individually or in the form of composites. One type of composite material that has been used successfully consists of an electrically insulating layer of Transite or ceramic supported by a steel backing. (Transite is a registered trademark of the Johns-Manville Corporation for an asbestos-cement composition.) When such a composite material is used it is clear that one component must be an electrical insulator at its operating temperature. Materials such as alumina, zirconia, quartz, and castable refractories have been successfully employed either alone or as coatings in composites. The material requirements for support 10 will obviously be less stringent at 500° C. or 700° C., for example, than at 1000° C. or 2800° C.

Container 11 serves to define a chamber for escape of volatiles, to prevent oxidation of the mass being baked, and to minimize excessive thermal shocking of the newly baked mass.

It should also be appreciated that other elements which line the apparatus and come in contact with the mass being processed, such as elements 14, 15, 16 and 18, should be substantially perfectly aligned so as to define straight and true cylinders or straight and true rectangular rods, etc. This alignment is important in order to avoid uneven electrical current distribution and also to avoid undesirable abrasion or uneven pressure distribution, etc. The substantially constant dimensions of the stock produced as a result of this alignment also reduces or entirely eliminates final machining of the product.

Figure 4:
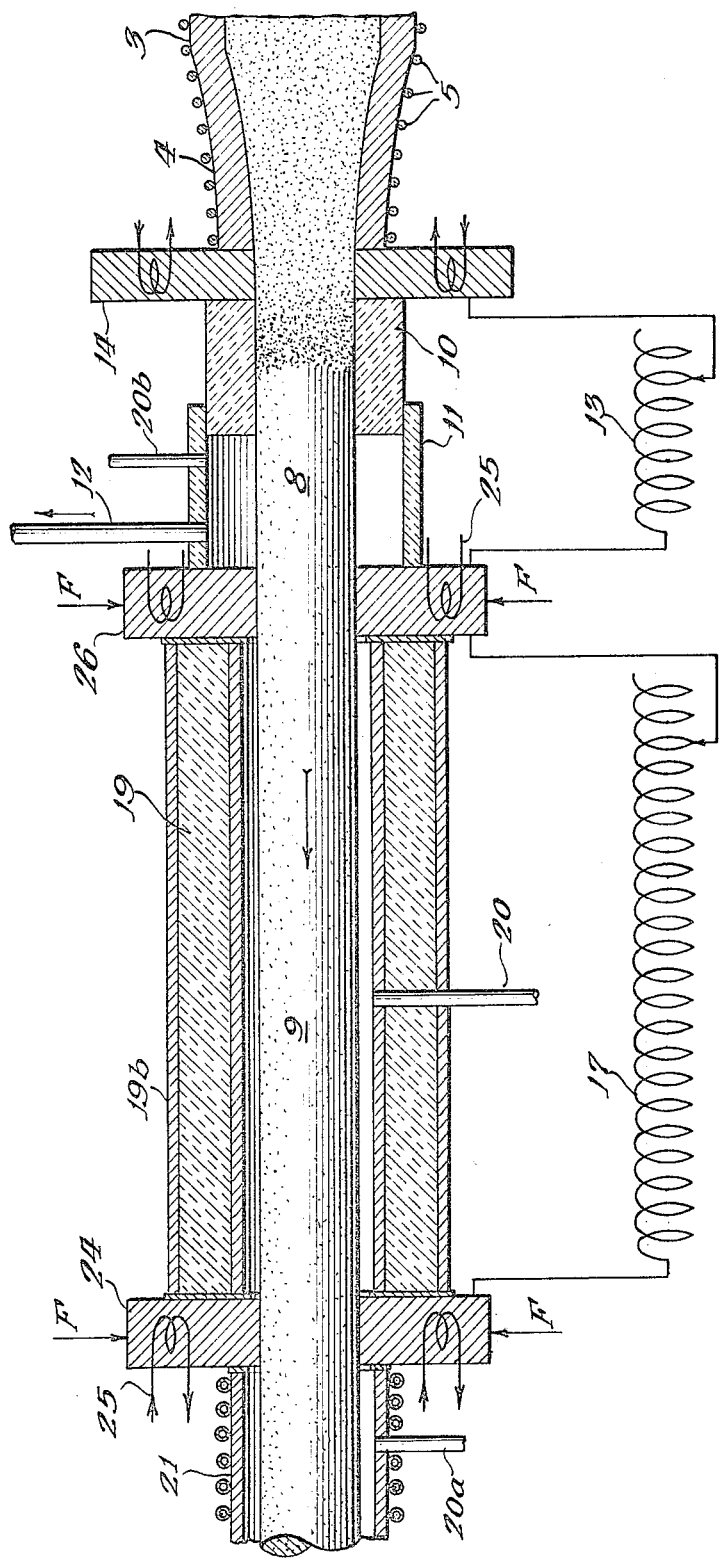
FIGURE 4 is a view similar to that of FIG. 1 but employing a combined bake and graphite power contact which functions also as the friction brake.

If desired the apparatus or process can be adapted to terminate after the baking step, and FIGURES 3, 5, 6, 7, 8, 9 and 12 show arrangements for this; or the processing may continue through a graphitization step, such as is illustrated by FIGURES 1, 2 and 4. Apparatus and processing temperature variations besides these two alternatives are also possible.

In FIG. 1 the baked mass 8 is forced on through the apparatus and becomes a resistance element in a graphitizing electrical circuit wherein current is made to flow through the baked mass by applying a voltage across said baked, rigid mass by means of electrical conductors in direct contact with said moving rigid mass. This circuit includes the secondary winding 17 of a power transformer, power contact 15 (which it will be noted is common to both the baking and the graphitizing circuits in the particular arrangement of this figure), the substantially continuously moving carbonaceous mass between power contacts 15 and 18 as it undergoes the change from the baked state 8 to the graphitized state 9, and power contact 18 which is in direct contact with the graphitized mass 9. Power contact 15 may be designated as the "upstream" graphitizing power contact, and contact 18 may be designated as the "downstream" graphitizing power contact; these contacts are typically made from carbon or graphite or a metal such as copper.

While the electrical resistance of the initial portion of the mass being heat-treated in this step is considerably less than the electrical resistance of the green carbonaceous mass, it will still be appreciated that by the time the carbonaceous mass being heat-treated reaches downstream power contact 18 its electrical resistance will be considerably reduced from what it was near power contact 15. In other words, as in the baking circuit, the total electrical resistance of the mass being heat-treated remains substantially constant, but is non-uniform or uneven at different portions thereof.

After the mass is heated to the desired temperature it is then forced through a cooling zone to bring it down to a temperature where it is resistant to attack by air. Prior to this and between power contacts 15 and 18, the mass is surrounded by insulation 19 which can be carbon black such as Thermax (a registered trademark of the R. T. Vanderbilt Company for finely-divided carbon) or other refractory material, suitably surrounding and surrounded by heat resistant materials such as graphite 19a and steel 19b respectively, or suitably fabricated into structural refractory units. The insulation means (such as 19a, 19 and 19b) typically does not contact the mass being heat-treated and the space between same is occupied by an inert gas, such as nitrogen, which can be introduced through inlet 20. Nitrogen is also typically introduced through inlets 20a in the cooling zone and 20b in the baking zone.

The cooling zone completes the enclosed portion of the apparatus and comprises a termal conductor 21, such as sheet steel or graphite or copper, surrounded by cooling coils 50. The cooling coils may typically be hollow copper coils which are cooled by water. Suitable insulating materials 11d and 11e are provided in the cooling zone to exclude air and to prevent electrical short-circuits. Insulators 11, 11a, 11b and 11c, illustrated in FIG. 1 and in other figures, have similar functions.

After being cooled to the desired temperature the stock can then be led onto a supporting run-out table or trough and then cut off at the desired length.

FIGURE 2 illustrates different electrical circuit and back pressure arrangements. In this set-up there is no common downstream bake and upstream-graphitizing power contact 15 such as in FIG. 1. Instead, there are separate downstream-bake (22) and upstream-graphitizing (23) power contacts. In the arrangement of FIG. 2 there is also no independent friction brake 16, such as there is in FIG. 1. Instead, back pressure exerted against the moving stock is effected by downstream-bake power contact 22 and downstream-graphitizing power contact 24. Power contacts 22, 23 and 24 will typically be water-cooled such as by coils 25, as will also other power contacts referred to in the invention.

FIGURE 3 illustrates an arrangement for carrying the process through the baking step only. It also illustrates a typical initial arrangement of a starter plug 40 in the apparatus. The plug will typically be long enough to extend from the green power contact(s) 14 to the bake power contact(s) 22 or beyond. The process is then started in a manner hereinafter to be described, utilizing temperature recording means for control purposes. Back pressure is exerted by water-cooled power contact(s) 22.

FIGURE 4 illustrates an arrangement where a single power contact 26 is employed as a downstream-bake contact, an upstream-graphitizing contact and as a friction-brake to exert back-pressure against the movement of the stock. Downstream-graphitizing power contact 24 may also be employed to exert back-pressure.

Figure 5:
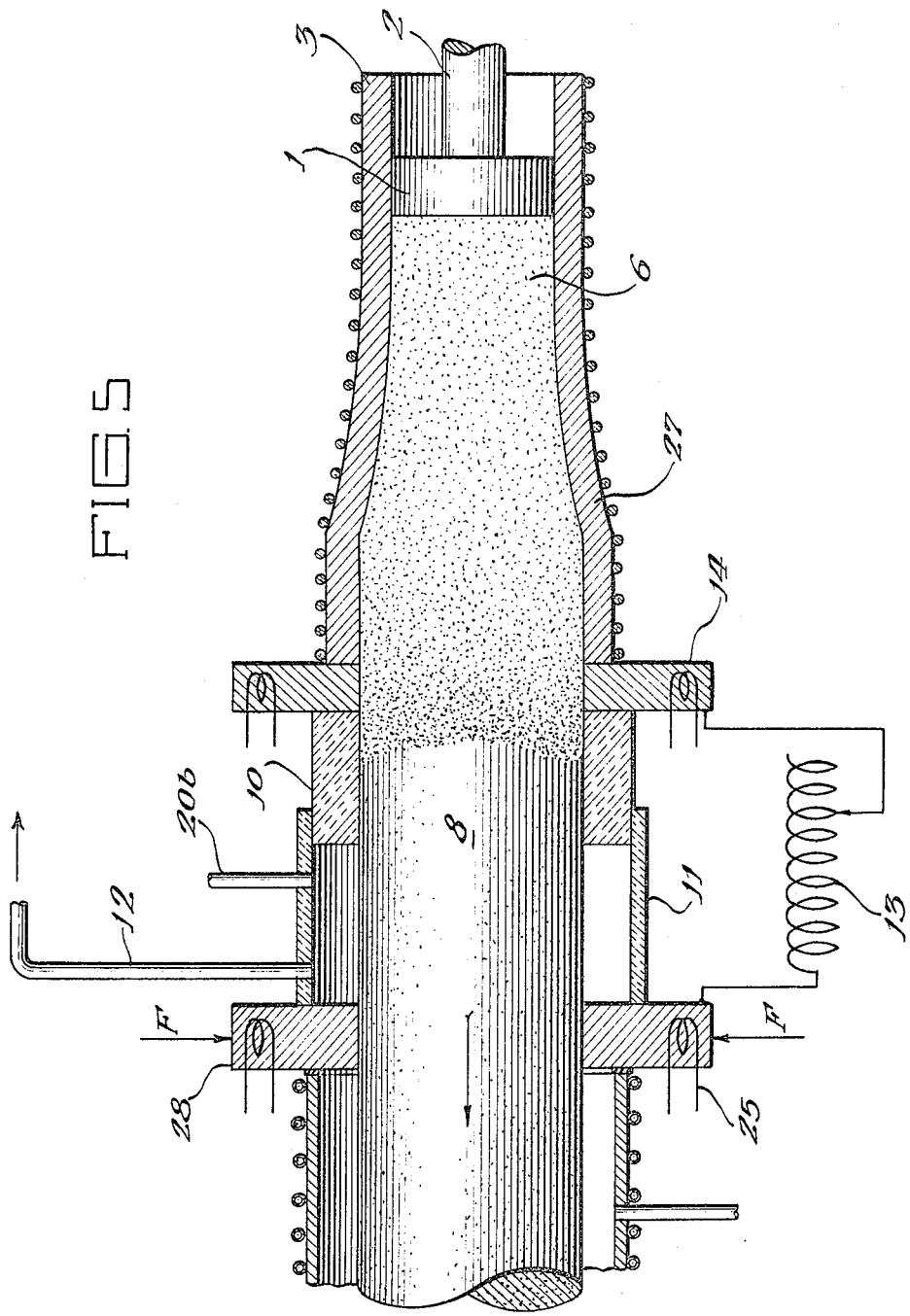
FIGURE 5 is a vertical cross-sectional view similar to that of FIG. 3 but of an apparatus which produces baked bodies having larger cross-sectional areas than those of the mud chamber of the extrusion system.

FIGURE 5 illustrates another forming arrangement which might typically be carried out when practicing the present invention. This figure shows the use of a diverging or an expansion section in the extrusion die, rather than a reducing section. Back pressure or reverse thrust is applied by contacts 28 and the baking process is started in a manner similar to that to be described hereinafter. A loose green mix 6 will typically be employed in this embodiment. It should be appreciated that, depending upon its inner configuration, the forming die of this figure can change the shape of the green mix from a small circular cross-section to a larger circular cross-section; or from a circular cross-section to a rectangular cross-section, one dimension of which is smaller than the diameter of the circle and the other dimension of which is larger than the diameter of the circle, etc.

Figure 6:
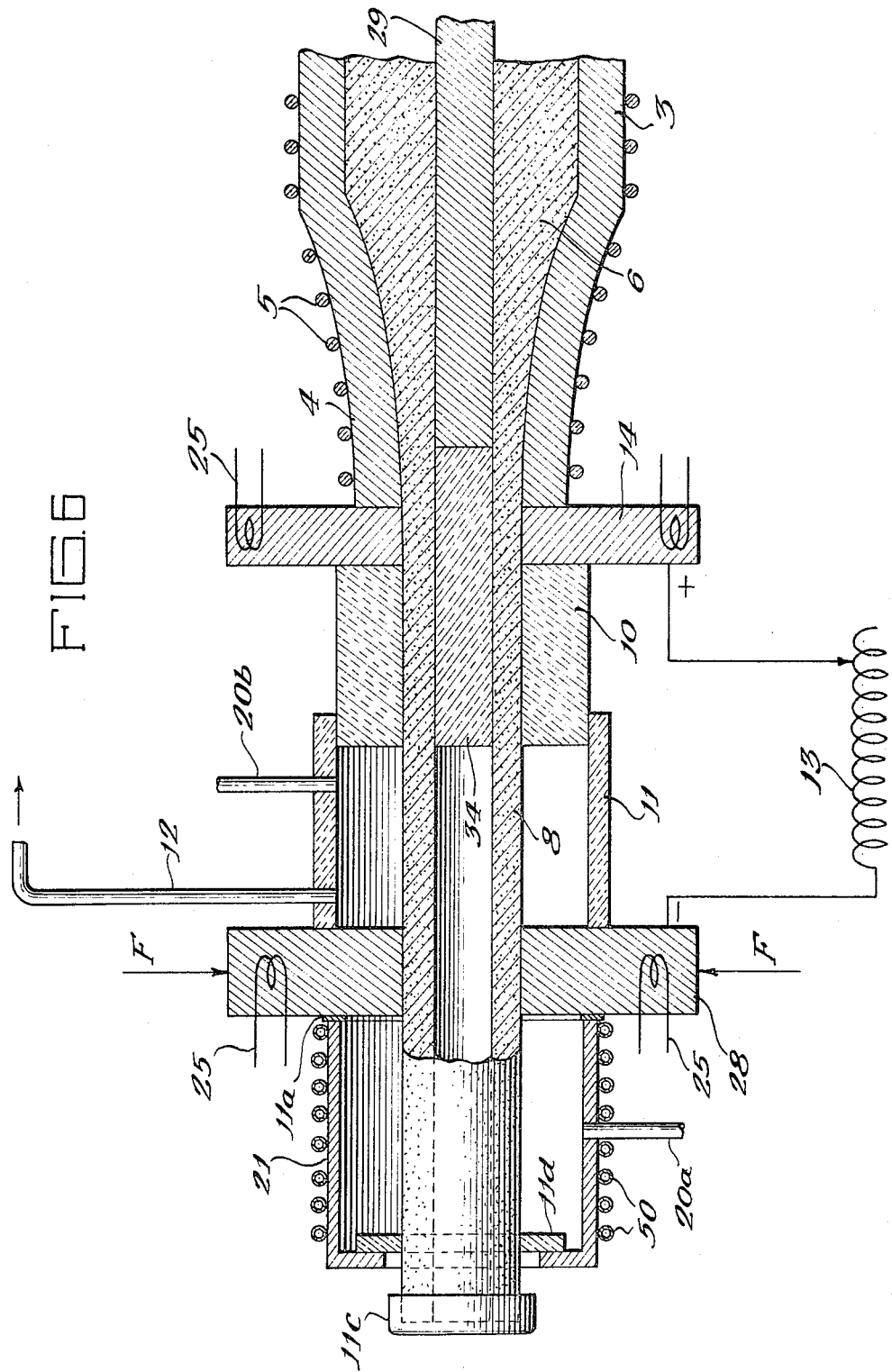
FIGURE 6 is a vertical cross-sectional view similar to that of FIG. 3 but of an apparatus which produces baked bodies having a tubular shaped cross-section; and which also employs an external peripheral "green" power contact; the flow of electrical current through the carbonaceous mass is substantially axial and the mandrel opposite the "green" power contact is an insulator.

FIGURE 6 illustrates the applicability of the process to the production of baked carbon tubes. In this arrangement, green mix 6 is forced around a mandrel which may comprise a conductor 29 and electrical insulator 34. The mandrel is supported in such a manner as to remain fixed as the mass passes over it. The mandrel defines a central cylindrical hole in the green carbonaceous mass being processed, and by the time the mass has passed the mandrel, it has become rigid in the form of a hollow tube.

The baking current path in this figure is also through a transformer winding 13, power contact 14, green, intermediary and baked carbonaceous mass 6 to 8 and contact 28, the latter functioning also to exert a back-pressure upon the mass being heat-treated. The length of electrical insulator 34 and the point where it contacts the conductor portion 29 of the mandrel may be varied in order to effect the desired current control. (FIGURES 7 and 8 to be described hereinafter illustrate these possible variations, as well as additional variations.) After the initial mass gets past the cooling zone and final electrical insulator(s) 11d, an air impervious cap 11c is placed over the end of the tube in order to prevent air from entering the hollow central core of the mass during the main portion of the heat-treating cycle. A plug may, of course, be used rather than a cap. Inlets 20a and 20b are for a non-oxidizing or inert gas such as $N_2$ in order to purge the system and prevent oxidation during the cycle. The central hole of the tube may also be purged with an inert gas.

It should be appreciated that the arrangement of this and other figures may readily be modified to include the graphitization step, or conversely that the arrangements of figures which include the graphitization step may readily be altered to delete this step.

Figure 7:
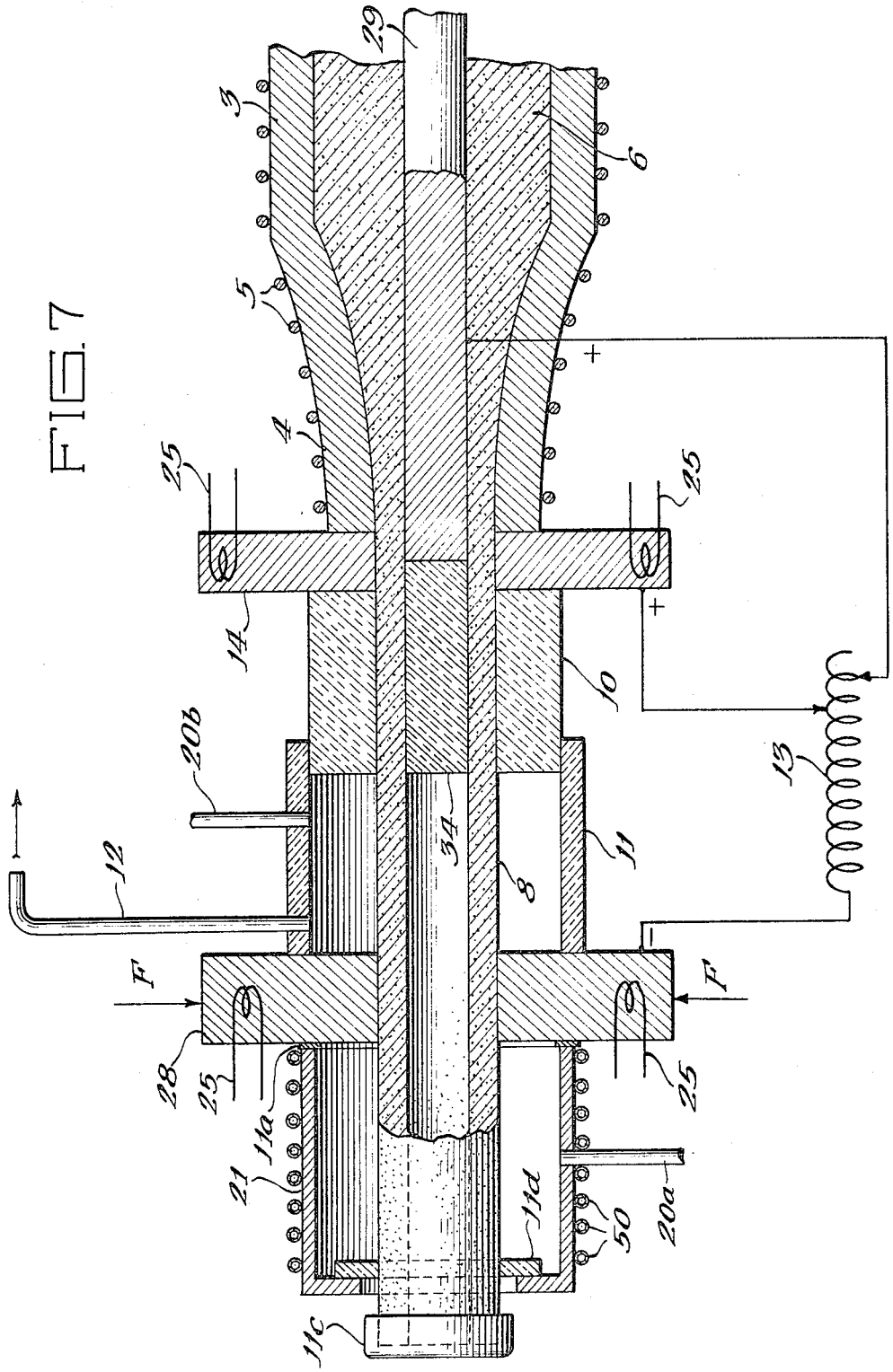
FIGURE 7 is a vertical cross-sectional view of an apparatus similar to that of FIG. 6 but which employs an inner peripheral or central (mandrel) "green" power contact as well as an external peripheral "green" power contact; the flow of electrical current through the carbonaceous mass is substantially axial.

FIGURE 7 also shows an arrangement for producing baked carbon tubes, but with an electrical arrangement different from that shown in FIG. 6. In a sense, the current goes from the transformer coil to two "upstream" bake power contacts, i.e. conductor portion 29 of the mandrel, and power contact 14, which are each tapped at different points on transformer coil 13 and hence at different voltages, then through the green, intermediary and baked carbonaceous mass, and finally back through power contact 28 to the opposite end of the transformer coil. Insulation 34 is employed in suitable areas, such as shown in the drawing, for best current control. Power contact 28 exerts the "back" pressure. The current path is partially transverse (through the green mass between the power contact 14 and the conductor portion 29 of the mandrel) and mostly axial through the mass to power contact 28.

Figure 8:
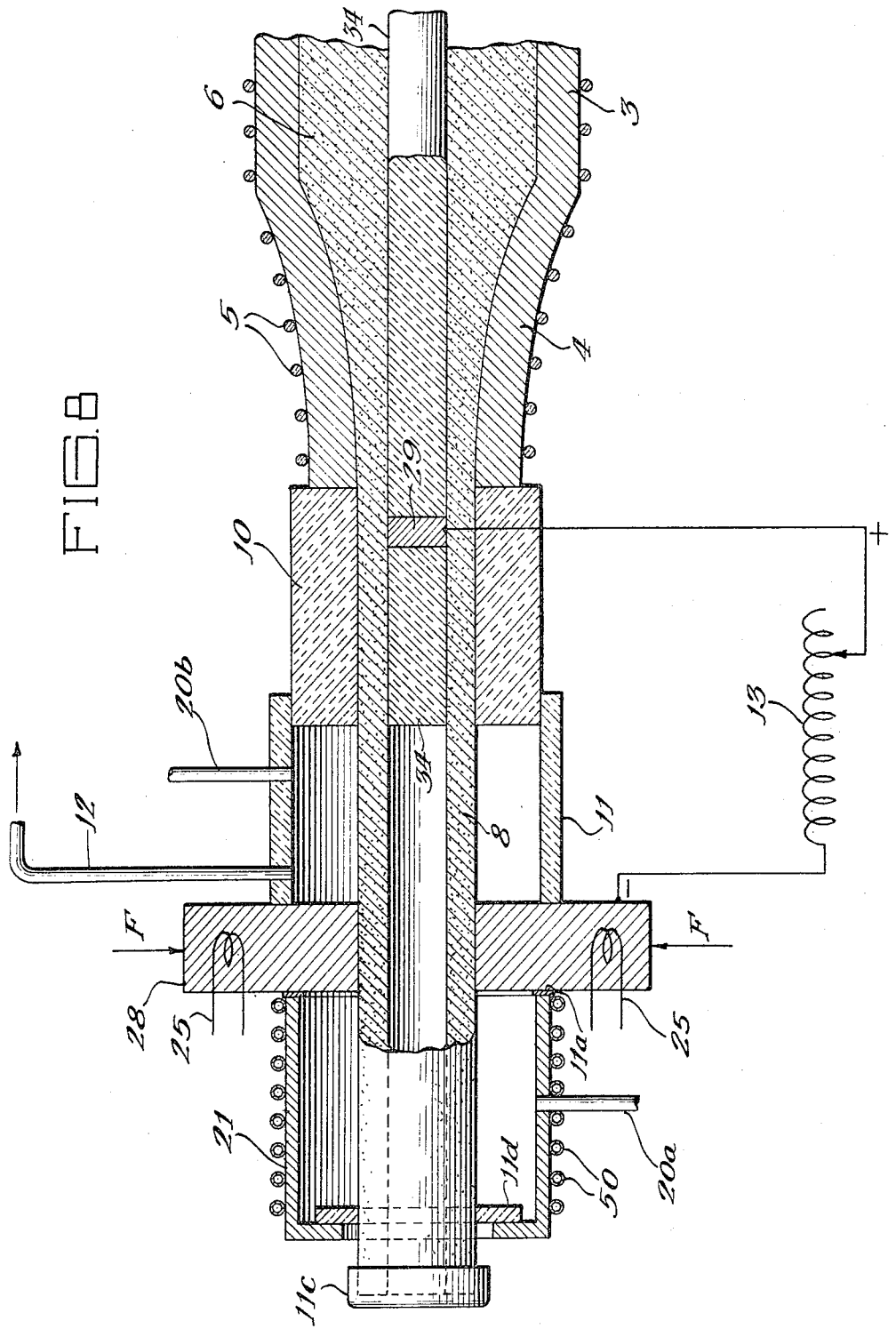
FIGURE 8 is a vertical cross-sectional view of an apparatus similar to that of FIG. 7 but employs no external peripheral "green" power contact; the flow of current through the carbonaceous mass is substantially axial with an energized mandrel segment or inner peripheral "green" power contact.

FIGURE 8 illustrates an apparatus arrangement which is approximately the same as that shown in FIG. 7 with the exception that no upstream external bake power contact such as 14 of FIG. 7 is employed. The system employs an energized mandrel (at 29) and a substantially axial electrical circuit running from transformer coil 13 to the mandrel at 29, through the green, intermediary and baked carbonaceous mass, 6 to 8, to downstream bake power contact 28 and then back to transformer 13.

Figure 9:
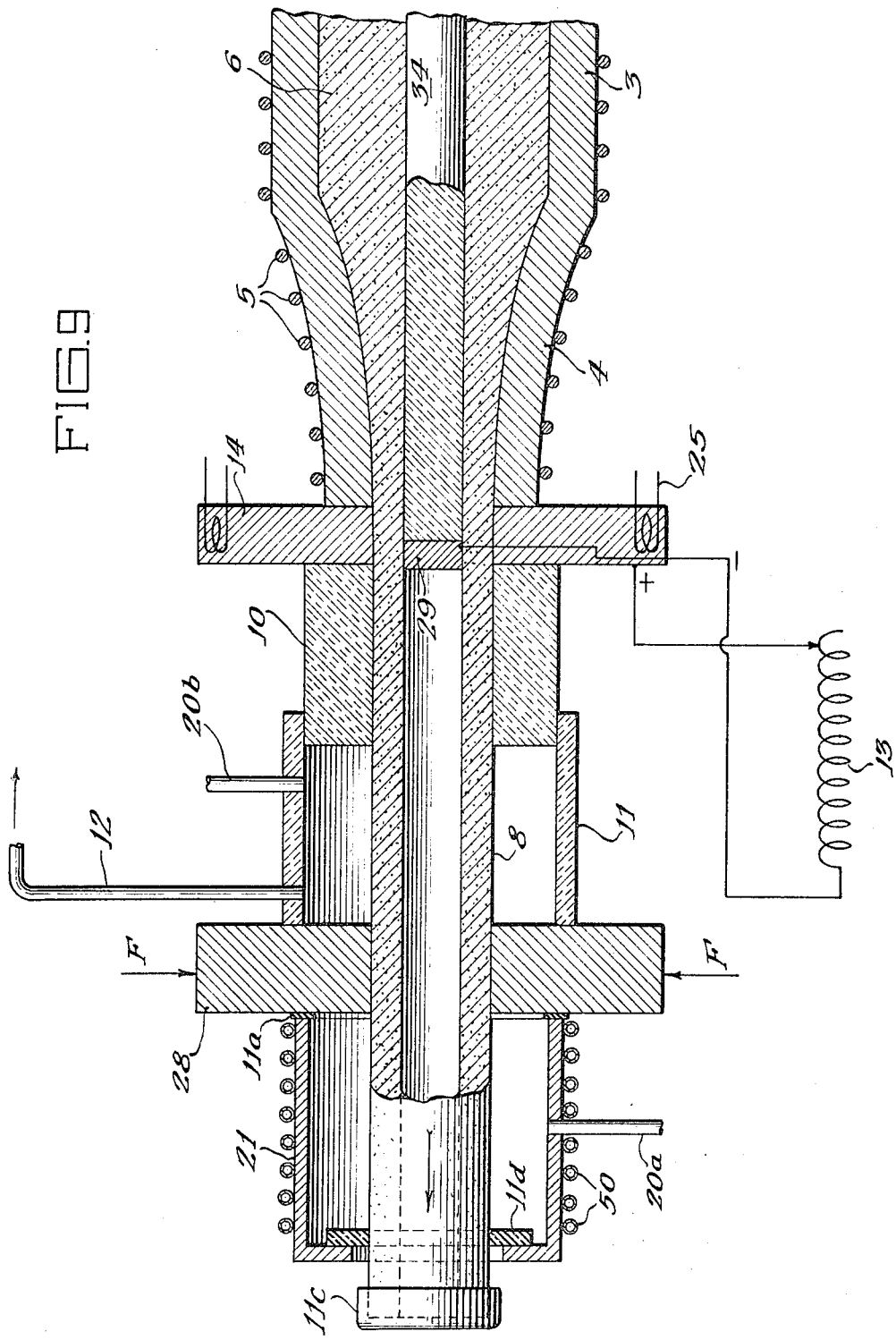
FIGURE 9 is a vertical cross-sectional view of an apparatus similar to that of FIGS. 6 or 7 but with a different electrical circuit arrangement; the apparatus employs an inner peripheral power contact and an external peripheral power contact, the flow of current through the carbonaceous mass is substantially transverse and there is no "downstream" bake power contact.

FIGURE 9 illustrates an apparatus arrangement which also is approximately the same as that shown in FIG. 7 with the exception that no downstream bake power contact is employed. The current path is primarily transverse or radial rather than axial and runs through the carbonaceous mass between the mandrel at 29 and power contact 14, each of which are energized by connections to transformer 13. Clamp 28 applies the necessary back pressure, but, unlike the electrical arrangements of FIGS. 7 and 8, it is not energized.

FIGURES 10, 10*a* and 10*b*, illustrate different green power contact electrical arrangements which may be resorted to when carrying out the baking phase of the process, all of which arrangements are within the scope of the invention. The arrangements may be employed when both baking and graphitizing, or when baking only. FIGURES 10*a* and 10*b* are taken across the line 10a—10a of FIG. 10, and these figures also show alternate transformer arrangements. In FIG. 10*a* three curved segments 14 and an auxiliary, three-phase transformer system 13a, 13b and 13c are employed; and in FIG. 10*b*, two linear contacts 14. The cross-section shown in FIGURE 10*b* assumes, of course, that extrusion die members 3 and 4 (see FIG. 1) are so shaped as to result in a rectangular cross-sectioned rod, while the cross-section shown in FIGURE 10*a* assumes that die members 3 and 4 are so shaped as to produce cylindrical rods. Insulators 34 are employed to separate and support the power segments. In both cases, the current path is from transformer coil 13 (in the case of FIGURE 10*a* from coils 13a, 13b and 13c), then through power contacts 14 (part of the current path here is transversely through the stock), then axially through the green, intermediary and baker mass, then back through power contact(s) 22 (which also applies the "back" pressure to the baked rigid mass) and then finally back to the terminal "B."

FIGURES 11, 11*a*, 11*b* and 11*c* are similar to FIGURES 10, 10*a* and 10*b*, but have different electrical arrangements. In these figures the currents are essentially radial or transverse with respect to the stock being heat-treated rather than axial, and it will be noticed that contact(s) 22 are not connected to transformer coil(s) 35, or, in the case of FIG. 11*b*, to 35a, 35b and 35c.

FIGURE 12 corresponds to FIG. 3 and shows an arrangement for controlling currents which are fed through the carbonaceous material being heat-treated. Variable rheostats 42, 43, 44 and 45 control the amount of current fed into power contact segments 14a, 14b, 14c and 14d (of FIG. 12*a* which is taken along line 12a—12a of FIG. 12), which segments, in turn, contact the periphery of the stock and control the current applied to same at any given portion. It should be appreciated that the number of segments employed, and their shape, are variable. For example they might be three in number or eight in number, or they might be curved or rectangular, depending upon the particular stock size and configuration, etc. Electrical insulators 47, such as shown in FIG. 12*a*, are employed to separate the power segments. Temperature recording means suitably located are employed in order to measure the temperatures of the mass in given areas, so that indicated needed current increases or decreases can be effected, when required, for uniform thermal treatment of the stock.

By proper and varied placement and utilization of insulators, peripheral support and defining members, mandrels and extrusion dies, etc., the carbonaceous mass which is heat-treated may be produced having almost any desired cross-section. It may have the regularl cross-sectional shapes already referred to, such as circular, annular square, and rectangular; or it may have one of the irregular cross-sectional shapes illustrated in FIGURES 13, 14, 15 and 16. It may even be subdivided into a plurality of extruded and heat-treated slabs such as illustrated in FIGURE 17.

In order to effect a good rate of processing the mass through the apparatus, very high currents are sent through the carbonaceous mass being converted from green to baked. Production rates of about 0.25 to about 3 inches per minute, and current densities from about 150 to about 500 amperes per square inch through the substantially continuously moving mass, are typical, although lower or higher current densities may be used. The rate of production is dependent upon the total power input. Current density for any given rate of power input is dependent upon the electrical and thermal characteristics of the green electrically conductive mass. When processing green electrically conductive carbonaceous compositions, required power input may vary from about 0.2 to about 2.0 kilowatt hours per pound of baked product, depending upon such variables as stock size and rate of throughput. In general the total power required will vary inversely with both the rate of throughput and the cross-sectional area of the stock.

Because the electrically conductive composition or carbonaceous mass being processed in the present invention is resistively heated and because in this type of heating the heat generated within the mass is a function of the square of the current passing therethrough and its electrical resistance, it will be seen that because of the very high currents corresponding to the high current densities just discussed and especially because of the constantly high electrical resistance of certain portions of the conductive composition or carbonaceous mass within the circuit (at least a part of the conductive composition or carbonaceous mass within the circuit is always in the green, high resistance state), large amounts of heat will be generated in a small segment of the conductive composition or carbonaceous mass. Because of these enormous rates of heating, the mass undergoes very radical changes-in-state in very short linear distances.

This rapid transition from the green state to the rigid state gives rise to what may be referred to as a transition zone or area in the apparatus or process. With particular reference to the processing of a carbonaceous mass, in this transition area the volatiles contained in the carbonaceous mass being processed are rapidly driven off and/or carbonized. Considerable arcing or channeling may occur because of uneven resistances. Also, gas pockets and occluded air, etc., may cause minor explosions or poor quality in the material being processed. Surface pitting or undesired deposits or buildup of carbon resulting in aggravated current unevenness may also occur. However, applicant has found that all of these problems are of a minimal nature if proper attention is given to the govering relationships such as the speeds or rates of processing the mass through the apparatus, the type mixtures employed or processed and their resistances, the electrical currents which are employed in heating the carbonaceous mass, the forward and back pressures, etc. With proper consideration of these factors the carbonaceous materials will be processed and heat-treated at attractive rates, high efficiencies and with a minimum of production problems, and a maximum of high quality product.

A very important aspect of this control is in starting the apparatus or process correctly. A starter plug 40 (FIG. 3) made of suitable material such as graphite, typically is positioned in such a manner that when the mix is forced against the plug there is a thin layer of green mix between the plug and the green power plate 14. Current is then forced from the power plate to the starter plug, thus heating the thin layer. After the temperature of the system, in particular the temperature of the mass in front of the green power plate 14, reaches a sufficiently high level, normal feed (or continuous steady motion of the carbonaceous mix) can be initiated. If a run is controlled from the beginning, stock with good structure and reproducible properties can readily be produced; however, it is virtually impossible to control a run, or obtain stock having the desired quality, if arcing and/or channeling are occurring.

If arcing and/or channeling are occurring, or are likely to occur, the power plate 14 may be divided into electrically independent segments, such as illustrated in FIG. 12a, and different voltages can be impressed on each of the segments such as by controlling the settings of rheostats, such as rheostats 42, 43, 44 and 45 illustrated in FIG. 12. Temperature measuring means such as four symmetrically located thermocouples placed in the bake transition zone near the power plate 14 will then typically be used and continuously checked during the run in order to monitor the uniformity of current distribution and prevent arcing.

Power contact or plate 14 should be constructed of a material which will readily conduct electricity. It should also be smooth and highly resistant to abrasion. Materials such as copper, steel and stainless steel have been successfully employed.

The bodies of the present invention which are unique because of the manner in which or processes by which they are produced may be of any desired length. Because the material being processed is free to move through the apparatus, the length of product produced may be virtually unlimited. This is in marked contrast to other carbon body heat-treating processes which are limited as to size of product because of mold dimensions, or furnace dimensions, etc.

The continuous movement of the baking mass through the apparatus is caused by an axial mechanical force exerted from behind the mass and to same in the direction that the mass is moving. This mechanical force may be provided in many ways, such as by an auger, or by a rapidly moving piston or pistons which have a backstroke of very short-time duration compared to their forward stroke. The pressure exerted against the mass by the axial mechanical force may vary widely. Typically it will be between about 100 p.s.i. and about 6000 p.s.i. (these pressures and those set forth as typical for the back pressure are meant to be illustrative only and not limitative) and sufficient to move the mass through the apparatus on a substantially continuous basis notwithstanding the back pressure—which it always exceeds—and which back pressure is exerted against the mass as it is being processed through the apparatus. This back pressure (restraining force) typically may vary between about 10 and about 4000 pounds per square inch of cross-sectional area, as previously stated, be effected in many ways such as peripherally or perimetrically (preferably) or axially against the movement of the mass such as by a hydraulic piston directed against the forward end of the moving mass. If effected peripherally, it may be provided by means such as illustrated in the drawings and already discussed, and this is the preferred way. The theoretical upper limit of back pressure will be determined by the resulting crushing strength of the baked stock (or of the rigidified conductive composition), and the lower limit determined by the pressure necessary to counter balance the pressure developed as a result of the rate of evolution of volatiles from the carbonization of the binder (or by that pressure necessary to counteract the tendency of the material being processed to "slump" before it becomes rigid).

The relationship of the two forces is such that the desired baking rate for the particular mass being processed is achieved, and the mass is in effect heated or baked under a substantial back pressure while the electric current is passing through same. This results not only in the advantage of a continuous process but also, when desired, a high degree of impermeability in the product can be achieved by the proper selection of process parameter.

In order that the concepts involved in this invention and the terms employed in the application and claims be clearly understood, several of the features thereof are now discussed or described in more detail.

The terms "perimetrical" or "peripheral," whether used in relation to the forming of the mass, or the frictional "drag" exerted upon same after it has become rigid, are meant to connote forces which are circumferential or which act around the body or its sides, be the body being produced circular, annular, square, rectangular, hexagonal, octagonal, or any other geometrical configuration in cross-section.

In describing the mass as moving "continuously" it is meant that the carbonaceous mass which is being processed is constantly moving typically at such a rate as about 0.25 to rates of 3 inches per minute (except for a negligibly short time required for piston back stroke during recharging of the apparatus when using a hydraulic ram), as it is being baked, and that the substantially continuous movement imparted to one end of the "green" mass by an axial mechanical force is transmitted to the mass in its rigid or baked and/or graphitized states as well.

By the term "plastic-like" is meant that the mass possesses or reaches a condition such as to be capable of conforming closely, particularly when under pressure such as when being consolidated or compressed, to the shape of the chamber in which it is contained. In general with mixtures of the type being processed and contemplated in the present application, the conductive composition or carbonaceous mass will be rendered in this plastic-like condition after it is heated in a range between about 20° C. and about 350° C.

As is clear from the drawings and from a consideration of the examples which follow, "consolidation" of the mass during which it is rendered "plastic-like" typically takes place in an extrusion type apparatus in which there may be compression of a loose-fill material, and reduction in cross-sectional area, such as when the apparatus shown in FIGURE 1 is employed; cross-sectional area expansion of a loose-fill material such as when the apparatus as shown in FIGURE 5 is employed; consolidation in the form of joinder of pre-shaped slugs; consolidation in the form of rendering a loose-fill material annular in cross-section such as when an apparatus as shown in FIGURE 6 is employed; etc. (Consolidation of the mass also takes place during the baking phase because of binder shrinking and coking and because of the back pressure, exerted against the moving rigid mass, which forces the particles of the mass close together.) In other words, "consolidation" is meant to connote any action by which the carbonaceous mass or pre-formed slugs are densified or rendered relatively uniform or homogeneous in nature.

As aforesaid, consolidation of the mass during which it is rendered "plastic-like" typically is carried out simultaneously while the mass is being extruded through a reducing or compressing section or die, or a non-reducing die, or an expansion section or die, or in a die in which expansion in one dimension and reduction in another dimension takes place. However, this type of consolidation, though preferably carried out on a continuous basis such as described above, may also be carried out in a separate forming operation or step, after which the formed mass is then baked continuously in a manner as described above. In other words, the mass is never completely restrained from moving on all of its sides or fronts as it is being baked, but it may sometimes be so restrained as it is being formed and during a good portion of its consolidation. In the heating or baking step, however, the leading end of the piece, be it rectangular or circular in cross-section, or any other configuration, is always able to continuously move through the apparatus according to a pre-determined baking rate.

By "baked" carbon bodies is meant that the carbonaceous mass is first formed into the desired cross-sectional shape (which, of course, is of considerably larger area than the particles employed in the carbonaceous mass) and is then heated sufficiently to render the mass substantially rigid and self-supporting, like a metal rod or bar, or to a point where the mass is no longer plastic-like or particulate. The same features apply to the heating of the green conductive composition to a rigid body. Temperatures between about 500° C. and about 1300° C. are typical "baking" or heating temperatures which bring about the physical changes described above, although heat-treating temperatures outside this range may of course also be employed.

Temperatures at various zones of the process may vary widely. They may, for example, range as follows:

|  | ° C. |
|---|---|
| Forming zone | 20–350 |
| Baking zone | 125–1300 |
| Graphitizing zone | 800–3000 |
| Cooling zone | 2900–300 |
| Temperature at cutting | 400–25 |

Typical temperatures of the stock in the forming zone are 125–350° C.; in the baking zone are 500–1300° C.; in the graphitizing zone are 2500–3000° C.; and in the cooling zone are 300–500° C.

The carbonaceous mass or mixture to be baked or conductive composition to be heated typically has a high electrical resistance. This resistance is a function of formulation as well as the rate at which the carbonaceous mass or conductive composition passes through the apparatus and the pressures and the temperatures employed while forming, and heating, etc. Its resistivity is typically very much higher than that of the mass after it has been heated and become rigid or baked. And in all cases in the present invention this resistance material comprises an element of a closed electrical circuit. In other words, in the apparatus arrangement employed, and because the current used is made to flow by applying a voltage across the moving composition by means of electrical conductors in direct contact with said moving composition, the current will have no other path to follow than through some part of the green conductive composition or unbaked green carbonaceous mass which is an integral part of the circuit. This method of heating is referred to as "resistive" heating and is distinguishable from such types of heating as "inductive" heating, or "dielectric" heating, or "conductive" heating for reasons discussed in more detail hereinafter. The process can be carried out using alternating current or direct current. The circuitry is not so designed, and deliberately not so, that the current while the process is underway goes through electrical conductors surrounding or enmeshed in the green carbonaceous mass. Nor is the design such that the current goes primarily through baked carbon rather than through the plastic-like carbonaceous mass, such as in Soderberg type electrodes. In either of these alternatives, the green composition would be heated or baked by heat received by thermal conduction, and the type of heating would be referred to as "conductive." Nor is the design or apparatus arrangement such that the mass is heated dielectrically. In dielectric heating the mass heated must be, in general, non-conductive; otherwise dielectric heating as such would be impossible because there would be a short circuit across the dielectric plates. Nor is the technique or arrangement employed to heat the conductive composition or mass one of inductive heating. The resistive type heating of the present invention requires the transmission of current through the composition being processed by applying a voltage from an external source across said composition by means of electrical conductors which are in direct contact with the composition being processed. In inductive heating no electrical conductors are in direct contact with the composition or mass being processed. In this invention, however, the generation of heat by means of resistive or resistance heating of the green conductive composition or plastic-like carbonaceous mass is an essential and indispensable attribute of the process and of the apparatus employed in carrying out the process. This is of considerable importance. The thickness of green conductive composition or unbaked carbonaceous mass which is in the electrical circuit, or distance that the current travels through unbaked stock is variable and depends upon circuit design (whether axial and/or transverse, etc.), power contact placement, rate of material through the apparatus, currents employed, etc., but these factors do not affect the essential characteristics of the type of heating employed. Besides the fact that the present invention involves passing an electrical current through the continuously moving carbonaceous mass while it is unbaked and typically, while it has a very high electrical resistance, the present invention also typically involves the passage of currents of very high densities through this high resistance green conductive composition or green carbonaceous mass. Therefore, because the heat generated within the mass being baked is a function of the square of the current passing therethrough and its resistance, and because of the high currents employed and the constantly high resistance of certain portions of the mass through which the current passes in the present invention, large amounts of heat are generated in small segments of the mass being heat-treated. This mode of heating and the heat generated thereby in the present process are very significantly different from those employed or encountered in any prior art practices having to do broadly with the development of or use of electrical currents to produce baked carbonaceous bodies. Typical currents employed or encountered in the present invention have already been briefly discussed and are set forth or illustrated in detail hereinafter.

The carbonaceous mass or mixtures which can be processed to make the baked bodies in the present invention may be selected from widely varying carbonaceous formulations such as: graphite flour and pitch; graphite flour, thermatomic carbon and pitch; calcined petroleum coke and pitch; anthracite and/or resistor coke and pitch; etc. The particle sizes of the carbonaceous materials employed, and the type and amount of binder (typically from about 15 to about 45 parts, by weight, per 100 parts of carbonaceous particles) may also be widely varied.

The process of this invention is capable of processing not only the foregoing illustrative carbonaceous materials or mixtures, but also any mixtures such as are shown in columns 27–34 of the Balaguer Patent 3,001,237. The present process is also capable of heat-treating other carbonaceous materials in a continuous manner, and of making useful products from same, which that patentee likely could not produce very well such as bodies with a high length to diameter ratio, for example, 40 feet long and 5 inches in diameter; this because the current path in the present invention can be through a thin layer of green mass which adds on to the baked mass, whereas in Balaguer's process, the current would have to go through a fairly thick mass in order to make a body having dimensions of any value. The apparatus and/or process of this invention can also be employed in the heat-treatment of carbonaceous blends having inorganic additives such as fuel elements (such as described in U.S. Patent 3,031,389) or neutron absorbing or reflecting materials incorporated therein; or in the heat-treatment of other materials such as are employed in the production of silicon carbide.

Electrically conductive granular materials such as hard metal carbides used to make grindstones, etc., with inorganic or organic binders may also be heat-treated or processed pursuant to this invention, so long as formed bodies produced from same are capable of becoming rigid upon being heated.

Carbonaceous mixes with synthetic resin binders can also be processed, with simultaneous curing of the resin and baking of the article; or merely during the curing of the resin step; or successively for the curing step and then for the baking step.

All of the foregoing materials may be designated as "electrically conductive compositions" in the sense that even though their initial electrical resistances may be quite high, electrical currents may be passed through them in accordance with the processing conditions of this invention. Sometimes the thickness of the layer of "unbaked" or "uncooked" composition through which the current passes will have to be less for some materials than for other materials, or the pressures (viz. either the forward pressure applied against the green mass or the reverse thrust applied against a rigid portion of the mass after it has been heated), or preliminary heating employed might have to be increased, or the processing rate of the material through the apparatus decreased, etc. But within these limitations the materials can be processed, and currents can be passed through them by means of "resistive" type heating, viz., they are "electrically conductive compositions."

As should be clear from the drawings, the electrical circuit arrangements which might be employed are highly flexible. Besides those illustrated many other alternatives are possible and within the scope of the invention. Thus, in place of separate circuits being employed for the baking and graphitizing steps, such as illustrated in FIG. 2, these may be combined into a single electrical circuit, so that the same current is employed to graphitize the rigid mass as is employed to bake the green carbonaceous mass (this typically being accomplished by making said current to flow by applying a voltage across the moving mass by means of electrical conductors, one of which is in direct contact with the green portion and the other of which is in direct contact with the graphitized portion of the moving mass; or conversely, increased to three or more circuits). If curing resins are employed separate electrical circuits may be employed for the curing and baking steps, or alternatively, a single electrical circuit, etc. The contacts employed in these circuits may also be of the revolving or sliding type as well as the stationary type.

The following examples are set forth to further illustrate the invention. A glossary of terms and abbreviations employed in the examples is as follows:

CTE—/° C.—Coefficient of thermal expansion (room temp. 100° C.)
MOE—p.s.i.—Modulus of elasticity
MOR—p.s.i.—Modulus of rupture
Back pressure, p.s.i.=Restraining force, pounds per square inch of cross-sectional area
A.D.—g./cc.—Apparent density
Elec. resis.—ohm-inch—Electrical resistivity
Comp. str.—p.s.i.—Compressive strength

*Example I*

Using the apparatus of FIGURE 3 with a four inch diameter mud cylinder and a three inch diameter processing section, a carbonaceous mix having a "green" apparent density of 1.87 g./cc.[1] and of the following composition:

| | Parts |
|---|---|
| 52%–200 mesh electric furnace graphite | 100 |
| B–1 pitch (coal tar pitch with a softening point of about 100° C. | 36 |
| Extrusion lubricant | 4 |

[1] This, and other green apparent densities which are set forth, refer to the apparent density of the material upon entering the critical zone and before it becomes rigid.

was processed. For start-up the basic procedure described previously was followed. The steady state conditions attained were as follows:

| | |
|---|---|
| Feed rate (stock) | 1.0 in./min. |
| Ram pressure | 2750 p.s.i. |
| Back pressure | 960 p.s.i. |
| Voltage | 8.01 volts |
| Current (168 amps/sq. in.) | 1190 amps. |
| Power (constant) (0.30 kwh./lb.)[1] | 8.12 kw. |

[1] Refers to power input—kilowatt hours per pound of baked product.

After processing, dimensional variations of the baked product were found to be extremely small (of the order of 0.006 inch on the diameter). After graphitization the physical properties were as follows:

Properties:
  CTE—
    (L)[1] _____ $17.7 \times 10^{-7}$/° C.
    (T)[2] _____ $19.7 \times 10^{-7}$/° C.
  MOE—(L) _____ $1.32 \times 10^6$ p.s.i.
  MOR—(L) _____ 3830 p.s.i.
  Comp. str.—
    (L) _____ 7060 p.s.i.
    (T) _____ 7620 p.s.i.
  Elec. resis.—(L) _____ $44.7 \times 10^{-5}$ ohm-in.
  A.D. _____ 1.76 g./cc.
  Permeability _____ 0.00016 Darcy.

[1] (L) Longitudinal or in the direction of processing.
[2] (T) Transverse or perpendicular to the direction of processing.

The product displayed a uniformly superior structure, free from internal cracks and faults associated with graphite produced by the conventional process.

*Example II*

Using the apparatus of FIGURE 3 except that the green mix was fed into the processing zone through a constant cross-section of three inches in diameter without the utilization of a reducing die, the carbonaceous mix of Example I was processed in this experiment. Steady state conditions attained during the run are listed below.

| | |
|---|---|
| Feed rate (stock) | 0.5 in./min. |
| Ram pressure | 940 p.s.i. |
| Back pressure | 720 p.s.i. |
| Voltage | 6.20 volts |
| Current (165 amps./sq. in.) | 1165 amps. |
| Power (constant) (0.49 kwh./lb.) | 6.66 kw. |

After graphitization the physical properties were as follows.

Properties:
  CTE—
    (L) _____ $26.4 \times 10^{-7}$/° C.
    (T) _____ $20.7 \times 10^{-7}$/° C.
  MOE—(L) _____ $1.08 \times 10^6$ p.s.i.
  MOR—(L) _____ 3240 p.s.i.
  Elec. resis.—(L) _____ $53.6 \times 10^{-5}$ ohm-in.
  A.D. _____ 1.77 g./cc.
  Permeability _____ 0.004 Darcy.

Comparing the properties of the products from Examples I and II, it is apparent that the relationship between the CTE's in the direction of and perpendicular to the direction of processing will be controllably dependent upon the degree of reduction the mix experiences prior to entry into the baking zone. Electrical resistivity and flexural strength are similarly affected.

*Example III*

In this experiment the apparatus used was similar to that of FIGURE 3 with a three inch mud cylinder and appropriately modified to accommodate the processing of rectangular stock 1¼ x 2½ inches in cross-section such as shown in FIGURE 10b. The charge used had a "green" apparent density of 1.83 g./cc. and had the following composition:

| | Parts |
|---|---|
| −20 mesh electric furnace | 100 |
| B–1 pitch | 34 |
| Extrusion lubricant | 4 |

Steady state conditions during the run were as follows:

| | |
|---|---|
| Feed rate (stock) | 0.25 in./min. |
| Ram pressure | 1290 p.s.i. |
| Back pressure | 220 p.s.i. |
| Voltage | 5.4 volts. |
| Current (271 amps./sq. in.) | 846 amps. |
| Power (constant) (1.48 kwh./lb.) | 4.33 kw. |

After graphitization the product exhibited the following properties.

Properties:
- CTE—
  - (L) _____ $16.0 \times 10^{-7}/°$ C.
  - (T) _____ $18.0 \times 10^{-7}/°$ C.
- MOE—(L) _____ $1.42 \times 10^6$ p.s.i.
- MOR—(L) _____ 2780 p.s.i.
- Comp. str.—
  - (L) _____ 6100 p.s.i.
  - (T) _____ 6040 p.s.i.
- Elec. resis.—
  - (L) _____ $43.6 \times 10^{-5}$ ohm.-in.
  - (T) _____ $41.5 \times 10^{-5}$ ohm-in.
- A.D. _____ 1.73 g./cc.

Dimensional variations of the baked product were found to be extremely small.

*Example IV*

Using apparatus illustrated in FIGURE 10 (and 10b) with a four inch mud cylinder and a ¾ x 3 inch rectangular processing section, a carbonaceous mix having a "green" apparent density of 1.88 g./cc. and of the following composition:

| | Parts |
|---|---|
| Graphite flour | 100 |
| B–1 pitch | 30 |
| Extrusion lubricant | 6 |

Steady state conditions during the run were as follows:

| | |
|---|---|
| Feed rate (stock) | 0.25 in./min. |
| Ram pressure | 5150 p.s.i. |
| Back pressure | 1560 p.s.i. |
| Voltage | 2.5 volts. |
| Current (444 amps/sq. in) | 1000 amps. |
| Power (constant) (1.03 kwh./lb.) | 2.2 kw. |

After graphitization the product displayed the following physical properties.

Properties:
- CTE—
  - (L) _____ $17.5 \times 10^{-7}/°$ C.
  - (T) _____ $19.6 \times 10^{-7}/°$ C.
- MOE—(L) _____ $1.3 \times 10^6$ p.s.i.
- MOR—(L) _____ 3600 p.s.i.
- Comp. str.—(L) _____ 6900 p.s.i.
- Elec. resis. _____ $47.4 \times 10^{-5}$ ohm-in.
- A.D. _____ 1.76 g./cc.

*Example V*

In the following example a tubular product three inches O.D. (outside diameter) and 2¼ inches I.D (inside diameter) in cross-section was produced employing the apparatus of FIGURE 6 equipped with a four inch mud cylinder. The charge processed had a green A.D. of 1.91 g./cc. and the following composition:

| | Parts |
|---|---|
| 52%–200 mesh graphite flour | 100 |
| B–1 pitch | 36 |
| Extrusion lubricant | 6 |

Steady state operating data were as follows:

| | |
|---|---|
| Feed rate (stock) | 0.5 in./min. |
| Ram pressure | 4500 p.s.i. |
| Back pressure | 1680 p.s.i. |
| Voltage | 4.5 volts. |
| Current (269 amps./sq. in.) | 830 amps. |
| Power (constant) (0.58 kwh./lb.) | 3.5 kw. |

The dimensional variations of the resulting product were extremely small being of the order of ±.002 on both the outside and inside diameters. After graphitization, the physical properties measured in the direction of processing, were as follows.

Properties:
- CTE _____ $20.0 \times 10^{-7}/°$ C.
- MOE _____ $14 \times 10^6$ p.s.i.
- MOR _____ 3900 p.s.i.
- Comp. str. _____ 8600 p.s.i.
- Elec. resis. _____ $39.5 \times 10^{-5}$ ohm-in.
- A.D. _____ 1.80 g./cc.
- Permeability _____ 0.0001 Darcy.

*Example VI*

Using apparatus of FIGURE 3 utilizing a nine inch diameter mud cylinder and a six inch processing zone, a carbonaceous mix having a green A.D. of 1.82 g./cc. and of the following composition was processed:

| | Parts |
|---|---|
| Antracite coal −10 mesh | 50 |
| Electric furnace graphite flour | 50 |
| B–1 pitch | 35 |
| Extrusion lubricant | 4 |

Steady state conditions attained during the run were as follows:

| | |
|---|---|
| Feed rate (stock) | 5/16 in./min. |
| Ram pressure | 1100 p.s.i. |
| Back pressure | 650 p.s.i. |
| Voltage | 9.0 volts. |
| Current (103 amps/sq. in.) | 2900 amps. |
| Power (0.75 kwh./lb.) | 24.7 kw. |

Physical properties of the baked product were as follows:

Properties:
- CTE—
  - (L) _____ $24.6 \times 10^{-7}/°$ C.
  - (T) _____ $30.5 \times 10^{-7}/°$ C.
- MOE—
  - (L) _____ $2.2 \times 10^6$ p.s.i.
  - (T) _____ $1.93 \times 10^6$ p.s.i.
- MOR—
  - (L) _____ 1820 p.s.i
  - (T) _____ 1890 p.s.i.
- Compr. str.—
  - (L) _____ 5330 p.s.i.
  - (T) _____ 6490 p.s.i.
- Resistivity—
  - (L) _____ $144 \times 10^{-5}$ ohm-in.
  - (T) _____ $155 \times 10^{-5}$ ohm-in.
- A.D.—
  - (L) _____ 1.72 g./cc.
  - (T) _____ 1.72 g./cc.
- Permeability—
  - (L) _____ 0.0006 Darcy.
  - (T) _____ 0.0001 Darcy.

*Example VII*

In the following experiment apparatus similar to that of FIGURE 3 with a three inch diameter mud cylinder and a two inch diameter processing section was utilized for the processing of a praphite flour-carbon black binary mix having a green A.D. of 1.78 g./cc. and of the following formulation:

| | Parts |
|---|---|
| Electric furnace graphite flour 52% —200 mesh | 75 |
| Carbon black | 25 |
| B-1 pitch | 33 |
| Extrusion lubricant | 6 |

Steady state operating conditions were:

| | |
|---|---|
| Feed rate (stock) | 9/16 in./min. |
| Ram pressure | 1000 p.s.i |
| Back pressure | 200 p.s.i. |
| Voltage | 4.8 volts. |
| Current (287 amps/sq. in.) | 900 amps. |

Physical properties of the baked product were:

Properties:
| | |
|---|---|
| MOE | $0.8 \times 10^6$ p.s.i |
| A.D. | 1.69 g./cc. |
| Elec. resis. | $120 \times 10^{-5}$ ohm-in. |
| Permeability | 0.0035 Darcy. |

Pore size distribution:
| | |
|---|---|
| 10 microns | 0%. |
| 10-1 microns | 11.8%. |
| 1-0.095 micron | 4.9%. |
| <0.095 micron | 7.8%. |
| Total porosity | 24.5%. |

*Example VIII*

The following experiment was made using the apparatus of Example II and a charge having a green A.D. of 1.77 g./cc. (Part A) and of 1.92 g./cc. (Part B) and of the following composition:

| | Parts |
|---|---|
| 52%-200 mesh electric furnace graphite flour | 100 |
| B-1 pitch | 36 |
| Extrusion lubricant | 4 |

This experiment was conducted in two parts, A and B, the steady state conditions for which are tabulated below:

| | Part A | Part B |
|---|---|---|
| Feed rate (stock) | 0.5 in./min | 0.5 in./min. |
| Ram pressure | 718 p.s.i | 1,500 p.s.i. |
| Back pressure | 326 p.s.i | 800 p.s.i. |
| Voltage | 6.30 volts | 5.88 volts. |
| Current | 1,120 amps (159 amps/sq. in.) | 1,200 amps (170 amps/sq. in.). |
| Power | 6.66 kw. (0.52 kwh./lb.) | 6.66 kw. (0.48 kwh./lb.). |

The two products from this experiment were then graphitized in a separate operation and the properties of the graphitized products are as follows:

| Properties | Part A | Part B |
|---|---|---|
| CTE: | | |
| (L) | $29.6 \times 10^{-7}$/° C | $27.4 \times 10^{-7}$/° C. |
| (T) | $21.6 \times 10^{-7}$/° C | $15.0 \times 10^{-7}$/° C. |
| MOE (L) | $1.13 \times 10^6$ p.s.i | $1.27 \times 10^6$ p.s.i. |
| MOR (L) | 1,975 p.s.i | 3,075 p.s.i. |
| Comp. Str. (L) | 5,700 p.s.i | 8,100 p.s.i. |
| Elec. Resis.: | | |
| (L) | $64.5 \times 10^{-5}$ ohm-in | $54.5 \times 10^{-5}$ ohm-in. |
| (T) | $47.0 \times 10^{-5}$ ohm-in | $37.5 \times 10^{-5}$ ohm-in. |
| A.D. | 1.67 g./cc. | 1.82 g./cc. |
| Permeability | 0.0080 Darcy | 0.0005 Darcy. |

It will be observed that the higher back pressure employed in Part B has resulted in a higher density, higher modulus of elasticity and higher strength as well as a lower electrical resistivity and lower coefficient of thermal expansion.

*Example IX*

The following example illustrates the production of a graphitized product according to the process of this invention. In this example the apparatus of FIGURE 1 was employed with a four inch mud cylinder and a three inch processing section. The charge composition had a green A.D. of 1.82 g./cc. and consisted of:

| | Parts |
|---|---|
| Electric furnace graphite flour —48 mesh | 100 |
| B-1 pitch | 36 |
| Extrusion lubricant | 4 |

Using the start-up procedure as previously described, the operating data after steady state conditions were attained, are as follows:

Baking zone:
| | |
|---|---|
| Feed rate (stock) | 0.5 in./min. |
| Ram pressure | 4250 p.s.i. |
| Back pressure | 1100 p.s.i. |
| Voltage | 7.2 volts. |
| Current (130 amps/sq. in.) | 920 amps. |
| Power (constant) (0.484 kwh./lb.) | 6.3 kw. |

Feed rate of three inch diameter stock—identical to that for the baking zone.

Graphitizing zone:
| | |
|---|---|
| Voltage | 19.2 volts. |
| Current (201 amps./sq. in.) | 1420 amps. |
| Power (constant) (1.91 kwh./lb. of graphitized product) | 24.9 kw. |

The product displayed the following physical properties:

Properties:
| | |
|---|---|
| CTE— | |
| (L) | $22.7 \times 10^{-7}$/° C. |
| (T) | $15.1 \times 10^{-7}$/° C. |
| MOE—(L) | $1.3 \times 10^6$ p.s.i. |
| MOR—(L) | 4350 p.s.i. |
| Comp. str.—(L) | 8400 p.s.i. |
| Elec. resis.—(L) | $37.3 \times 10^{-5}$ ohm-in. |
| Permeability | 0.00015 Darcy. |
| A.D. | 1.70 g./cc. |

*Example X*

The following experiment was conducted with apparatus similar to that of Example I using two different carbonaceous mix compositions.

Part A utilizing a mix having a green A.D. of 1.80 g./cc. and a composition of:

| | Parts |
|---|---|
| Electric furnace graphite flour | 50 |
| Coke flour | 50 |
| B-1 pitch | 35 |
| Extrusion lubricant | 4 |

Part B utilizing a mix having a green A.D. of 1.79 g./cc. and a composition of:

| | Parts |
|---|---|
| Electric furnace graphite flour | 25 |
| Coke flour | 75 |
| B-1 pitch | 35 |
| Extrusion lubricant | 4 |

Steady state conditions obtained during the run were as follows:

| | Part A | Part B |
|---|---|---|
| Feed rate (stock) | 1/4 in./min | 1/4 in./min. |
| Ram pressure | 1,890 p.s.i | 1,715 p.s.i. |
| Back pressure | 749 p.s.i | 788 p.s.i. |
| Voltage | 5.75 volts | 6.11 volts. |
| Current | 1,090 amps (154 amps/sq. in.) | 1,150 amps (163 amps/sq. in.). |
| Power | 5.9 kw. (constant) (0.91 kwh./lb.) | 6.6 kw. (constant) (1.04 kwh./lb.). |

Properties of the graphitized product from the two parts are tabulated as follows for comparison:

| Properties | Part A | Part B |
|---|---|---|
| CTE: | | |
| (L) | $17.4 \times 10^{-7}$/° C. | $16.0 \times 10^{-7}$/° C. |
| (T) | $22.0 \times 10^{-7}$/° C. | $20.8 \times 10^{-7}$/° C. |
| MOE (L) | $1.48 \times 10^6$ p.s.i. | $1.50 \times 10^6$ p.s.i. |
| MOR (L) | 3,550 p.s.i. | 4,410 p.s.i. |
| Comp. Str.: | | |
| (L) | 6,390 p.s.i. | 6,560 p.s.i. |
| (T) | 6,600 p.s.i. | 7,120 p.s.i. |
| Elec. Resis.: | | |
| (L) | $45.0 \times 10^{-5}$ ohm-in. | $41.0 \times 10^{-5}$ ohm-in. |
| (T) | $38.0 \times 10^{-5}$ ohm-in. | $34.0 \times 10^{-5}$ ohm-in. |
| A.D. | 1.70 g./cc. | 1.67 g./cc. |

It may be observed that the change of the graphite-coke binary formulation results in a direct change in the physical properties of the end product. With the higher percentage of coke in the formulation, the significant increase in MOR, Compressive Strength and MOE, and the reduction in A.D., CTE and resistivity are significant.

*Example XI*

In the following experiment utilizing apparatus of FIGURE 3, a three inch diameter mud cylinder and a processing zone of identical cross-section, a mix of the following composition and having a green A.D. of 1.77 g./cc. was processed:

| | Parts |
|---|---|
| —20 mesh calcined petroleum coke | 100 |
| B–1 pitch | 36 |
| Extrusion oil | 4 |

Steady state conditions during the run were:

| | |
|---|---|
| Feed rate (stock) | 3/16 in./min. |
| Ram pressure | 1215 p.s.i. |
| Back pressure | 800 p.s.i. |
| Voltage | 4.2 volts. |
| Current (195 amps./sq. in.) | 1380 amps. |
| Power (constant) (1.09 kwh./lb.) | 5.2 kw. |

Physical properties of the product after graphitization were:

Properties:
| | |
|---|---|
| CTE—(L) | $30 \times 10^{-7}$/° C. |
| MOE | $1.05 \times 10^6$ p.s.i. |
| MOR | 3000 p.s.i. |
| Comp. str. | 6500 p.s.i. |
| Elec. resis. | $41.5 \times 10^{-5}$ ohm-in. |
| A.D. | 1.65 g./cc. |

*Example XII*

The following example illustrates the uniformity of the products produced by the process of the present invention with respect to some of the important physical properties. The apparatus used was similar to that of FIGURE 3. The mud cylinder was nine inches in diameter and the baking section six inches in diameter. The charge composition in this example had a green A.D. of 1.88 g./cc. and consisted of:

| | Parts |
|---|---|
| —20 mesh electric furnace graphite | 100 |
| B–1 pitch | 30 |
| Extrusion lubricant | 4 |

Steady state conditions attained during the run were as follows:

| | |
|---|---|
| Feed rate (stock) | 3/8 in./min. |
| Ram pressure | 4450 p.s.i. |
| Back pressure | 2260 p.s.i. |
| Voltage | 8.2 volts. |
| Current (115 amps/sq. in.) | 3250 amps. |
| Power (constant) (0.60 kwh./lb.) | 24.6 kw. |

The product was sectioned according to FIGURE 18 with eighteen longitudinal core samples cut out of the stock, and the sample sections individually tested. The results are tabulated in Table I.

TABLE I

| Sample | CTE [1] (per ° C.) | MOE [2] (p.s.i.) | MOR (p.s.i.) | Comp. Str. (p.s.i.) | Resis.[3] (ohm-in.) | A.D. (g./cc.) | Brin. Hard. | Perm. (Darcy) |
|---|---|---|---|---|---|---|---|---|
| A | 28.7 | 1.98 | 3,930 | 6,960 | 84.5 | 1.77 | 15.5 | .0004 |
| B | 27.3 | 1.83 | 3,600 | 8,770 | 76.1 | 1.78 | 16.6 | .0004 |
| C | 27.3 | 1.90 | 3,620 | 8,910 | 83.9 | 1.76 | 14.4 | .0004 |
| D | 28.2 | 1.86 | 4,230 | 9,710 | 76.5 | 1.76 | 15.5 | .0004 |
| E | 28.2 | 1.87 | 4,360 | 8,030 | 71.9 | 1.77 | 16.6 | .0004 |
| F | 27.8 | 1.82 | 3,960 | 8,900 | 84.0 | 1.76 | 14.4 | .0006 |
| G | 28.7 | 1.87 | 4,030 | 9,770 | 75.0 | 1.76 | 14.4 | .0004 |
| H | 28.2 | 1.89 | 4,500 | 9,000 | 70.8 | 9.76 | 16.6 | .0006 |
| I | 27.3 | 1.87 | 3,610 | 8,530 | 70.7 | 1.77 | 16.6 | .0004 |
| J | 28.2 | 1.80 | 3,670 | 9,210 | 82.0 | 1.76 | 15.5 | .0006 |
| K | 27.8 | 1.85 | 3,760 | 9,800 | 76.8 | 1.76 | 15.5 | .0004 |
| L | 28.2 | 1.92 | 4,240 | 10,330 | 73.8 | 1.76 | 16.6 | .0004 |
| M | 28.2 | 1.70 | 3,520 | 8,490 | 73.6 | 1.76 | 16.6 | .0006 |
| N | 28.7 | 1.99 | 3,670 | 9,860 | 85.0 | 1.77 | 15.5 | .0004 |
| O | 28.2 | 1.86 | 4,020 | 7,950 | 81.6 | 1.76 | 14.4 | .0004 |
| P | 27.8 | 1.97 | 4,030 | 9,260 | 78.8 | 1.76 | 15.5 | .0004 |
| Q | 27.8 | 1.97 | 3,780 | 8,700 | 88.0 | 1.78 | 14.4 | .0004 |
| R | 27.3 | 1.97 | 3,910 | 8,710 | 87.3 | 1.77 | 15.5 | .0004 |
| Average | 28.0 | 1.88 | 3,910 | 8,950 | 78.6 | 1.77 | 15.5 | .0005 |

[1] Multiply all values by $10^{-7}$.  [2] Multiply all values by $10^6$.  [3] Multiply all values by $10^{-5}$.

It should be emphasized that the "back" pressure or restraining force set forth in the foregoing examples and employed in the present invention is always "downstream" of the area where the green mass being processed and heated is transformed from the green state to the rigid state and that the restraining force, therefore, is always excited upon the mass after it has become rigid and self-supporting. This is also clear from the drawings illustrating the invention. This is in marked contrast to the types of restraining forces which are present in conventional extrusion operations, wherein the forces are not subject to ready adjustment and control but instead are dependent upon the characteristics of the material being extruded and the configuration of the die. This restraining force excited against the rigid portion of the mass being processed is transmitted to the plastic portion of the mass undergoing transition to the rigid state. This restraining force of the present invention, in conjunction with the supporting means used to surround the plastic portion of the mass, is employed in order to maintain the structural integrity of the bodies being produced. The restraining force also insures that the mass within the circuit is maintained at a relatively high density level. In the case of the processing of a green carbonaceous mass or mixtures containing carbonizable binders it functions as a counteraction against the forces created by the gases evolved by heating, thereby minimizing poor quality or poor processing conditions, for example, non-uniform and highly porous products, or fires or even explosions such as can result from uncontrolled release of gases. The restraining force also reduces the percentage of volatiles evolved and effectively brings about a higher degree of utilization or yield of the carbon in the volatiles as residual carbon. It can also function to compact the material in those instances where the composition is undergoing a substantial volume change.

The amount of restraining force employed is variable but from the foregoing discussion it can be seen that it is at least sufficient to maintain the structural integrity of the mass being processed and prevent it from slumping, or in the case of a mass which evolves gases, to prevent these gases from unduly impairing the properties of the bodies being produced or to prevent them from causing explosion, either of which could result because of an uncontrolled release of gases. Generally a minimum of at least 50 p.s.i. restraining pressure will be excited upon the rigid portion of the mass being processed (although pressures as low as about 10 p.s.i. may be operative for certain purposes). The maximum restraining force or reverse thrust is limited by the crushing strength of the body being produced after it has become rigid.

It should also be clear from the examples that the apparent density of the green electrically conductive composition or green electrically conductive carbonaceous mass employed in the present invention is relatively high. In order that the green electrically conductive composition or green carbonaceous mass may be employed in the processes and apparatuses of the present invention, its apparent density should generally be at least about 1.40 g./cc. and more typically will be between about 1.60 and about 2.00 g./cc. This typically results in rigid or baked or graphitized bodies having an apparent density of at least about 1.35 g./cc. and more typically between about 1.55 and about 1.90 g./cc. Inorganic additives to the green carbonaceous mass, or the use of green conductive compositions other than a green carbonaceous mass would change the apparent density of the green mass or composition being processed (typically increase it) in proportion to the quantity and specific gravity of the additive(s) or compositions being used.

The products of the present invention are characterized by the uniform properties they possess. This is not to say, however, that the products of this invention will not differ in their properties if various different formulations (e.g. formulations using graphite particles, or calcined petroleum coke particles, or anthracite particles, or carbon black, or mixtures, etc.) are employed. Nor does it mean that the products will not differ in their properties no matter what pressures or currents or rates, etc., are employed. But it does mean that for any given formulation and for any given set of processing conditions, types of products having remarkably different properties, yet remarkably uniform properties are achievable. This is because of a number of factors. One of these (e.g. in the processing of a green carbonaceous mass or a green conductive composition which evolves gases) is the fact that typically the volatiles escape downstream substantially uniformly from across the entire face of the advancing carbonaceous mass which is being converted from the green to the baked condition regardless of the cross-sectional configuration of the body being produced. Because of this "volatile escape" route, and because also while this is occurring the mass is under pressure and part of the volatiles are being carbonized and filling in the pores of the mass being processed, the result typically is the production of products of very uniform porosity, and of reduced porosity and high density. This in turn typically causes the products to have high strength and low permeability.

The products of this invention are also unique in that they typically possess properties which are attainable (if at all) in products of the prior art only by elaborate forming and baking techniques or by post-heating or post-baking procedures such as impregnation followed by re-baking, or elaborate post-baking machining, or post-baking reheating and reworking, all of which would be expensive and time-consuming. In other words, the products of the present invention frequently or typically may possess unusual or unique strengths, densities, permeabilities, pore-size and distributions, cross-sectional configurations, or CTE and thermal conductivity relationships (such as the relationship of the transverse CTE to the longitudinal CTE) in their as-produced condition without requiring any of these special processing techniques. For example, products having the cross-sectional configurations illustrated in FIGS. 13–16 can be readily produced in the present invention, and these products can be of any desired length (e.g. they could be 60 feet or more long, if desired) and would be of high-strength, and of substantially uniform porosity and density throughout, and would require no post-baking machining or boring or drilling, or impregnation and re-baking, etc., in order to achieve the desired product.

It is to be understood that the invention is not limited to the specific examples which have been offered merely as illustrative and that modifications may be made within the scope of the appended claims without departing from the spirit of the invention.

I claim:

1. A process for applying electrothermal energy to a green electrically conductive composition which becomes rigid upon being heated, which comprises:
   (A) substantially continuously and mechanically forcing said green composition into and through a heating zone wherein said green composition is resistively heated and rendered substantially rigid and self-supporting by the passage of current therethrough, said current being made to flow by applying a voltage across the moving composition by means of electrical conductors at least one of which is in direct contact with a green portion of said moving composition;
   (B) maintaining said moving composition under a substantial pressure during its transition from the green to rigid state, said pressure being maintained by a restraining force excited upon the rigid mass, which restraining force tends to oppose the axial movement of the composition as it is being processed, said restraining force being at least equal to that necessary to maintain the structural integrity of the conductive composition during the time it is heated from the green state to the rigid state; and
   (C) supporting said moving conductive composition during its transition to the rigid state and substantially preserving its shape by means of a transition section which contains a high temperature resistant electrical insulating material.

2. A process for applying electrothermal energy to a green electrically conductive composition which evolves gases and which becomes rigid upon being heated, which comprises:
   (A) substantially continuously and mechanically forcing said green composition into and through a heating zone wherein said green composition is resistively heated and rendered substantially rigid and self-supporting by the passage of current therethrough, said current being made to flow by applying a voltage across the moving composition by means of electrical conductors at least one of which is in direct contact with a green portion of said moving composition;
   (B) maintaining said moving composition under a substantial pressure during its transition from the green to rigid state, said pressure being maintained by a restraining force excited upon the rigid mass, which restraining force tends to oppose the axial movement of the composition as it is being processed, said restraining force being at least equal to that necessary to maintain the structural integrity of the conductive composition during the time it is heated from the green state to the rigid state and while the gases are evolved; and (C) supporting said moving conductive composition during its transition to the rigid state and substantially preserving its shape by means of a transition section which contains a high temperature resistant electrical insulating material.

3. A process for applying electrothermal energy to a green electrically conductive composition which evolves gases and which becomes rigid upon being heated, said green composition having an A.D. of at least 1.4 g./cc. which comprises:

(A) substantially continuously and mechanically forcing said green composition into and through a heating zone wherein said green composition is resistively heated and rendered substantially rigid and self-supporting by the passage of current therethrough, said current being made to flow by applying a voltage across the moving composition by means of electrical conductors at least one of which is in direct contact with a green portion of said moving composition;

(B) maintaining said moving composition under a substantial pressure during its transition from the green to rigid state, said pressure being maintained by a restraining force excited upon the rigid mass, which restraining force tends to oppose the axial movement of the composition as it is being processed, said restraining force being at least equal to that necessary to maintain the structural integrity of the conductive composition during the time it is heated from the green state to the rigid state and while the gases are evolved; and (C) supporting said moving conductive composition during its transition to the rigid state and substantially preserving its shape by means of a transition section which contains a high temperature resistant electrical insulating material.

4. A process for producing baked carbon bodies from a green electrically conductive carbonaceous mass which evolves gases and which becomes rigid upon being heated, said green carbonaceous mass having an A.D. of at least 1.4 g./cc. which comprises:

(A) substantially continuously and mechanically forcing said green carbonaceous mass into and through a baking zone wherein said green mass is resistively heated and rendered substantially rigid and self-supporting by the passage of current therethrough, said current being made to flow by applying a voltage across the moving mass by means of electrical conductors at least one of which is in direct contact with a green portion of said moving mass;

(B) maintaining said moving mass under a substantial pressure during its transition from the green to rigid state, said pressure being maintained by a restraining force excited upon the rigid mass, which restraining force tends to oppose the axial movement of the mass as it is being processed, said restraining force being at least equal to that necessary to maintain the structural integrity of the carbonaceous mass during the time it is heated from the green state to the rigid state and while the gases are evolved; and (C) supporting said moving carbonaceous mass during its transition to the rigid state and substantially preserving its shape by means of a transition section which contains a high temperature resistant electrical insulating material.

5. A process according to claim 4 wherein said green carbonaceous mass has inorganic additives incorporated therein.

6. A process according to claim 4 wherein the flow of the current through the green carbonaceous mass is in a substantially transverse direction.

7. A process according to claim 4 wherein the flow of the current through the green carbonaceous mass is in a substantially axial direction.

8. A process according to claim 4 wherein the mass is surrounded by oxidation preventing means while it is being baked and until it is cooled to a temperature no higher than about 350° C.

9. A process according to claim 4 wherein the resistance of the substantially continuously moving mass undergoes a longitudinal reduction from about 10 to 1 to about 500 to 1 along the path of feed as it changes from the green state to the baked state.

10. A process according to claim 4 wherein the mechanical axial force acting upon one end of the green carbonaceous mass is equivalent to between about 100 pounds per square inch of cross-sectional area and about 6000 pounds per square inch of cross-sectional area, the restraining force tending to oppose the axial movement of the composition is equivalent to between about 10 pounds per square inch of cross-sectional area and about 4000 pounds per square inch of cross-sectional area, the mechanical axial force in any given case always being greater thereby insuring the substantially continuous movement of the composition.

11. A process for producing baked carbon bodies having an A.D. between about 1.35 and about 1.90 g./cc. from a green electrically conductive carbonaceous mass which evolves gases and which becomes rigid upon being heated, said green composition having an A.D. of between about 1.4 and about 2.0 g./cc. which comprises:

(A) substantially continuously and mechanically forcing said green carbonaceous mass into and through a baking zone wherein said green mass is resistively heated and rendered substantially rigid and self-supporting by the passage of current therethrough, said current being made to flow by applying a voltage across the moving mass by means of electrical conductors at least one of which is in direct contact with a green portion of said moving mass;

(B) maintaining said moving mass under a substantial pressure during its transition from the green to rigid state, said pressure being maintained by a restraining force equivalent to at least 50 pounds per square inch of cross-sectional area excited upon the rigid mass, which restraining force tends to oppose the axial movement of the mass as it is being processed, said restraining force also being at least equal to that necessary to maintain the structural integrity of the carbonaceous mass during the time it is heated from the green state to the rigid state and while the gases are evolved; and (C) supporting said moving carbonaceous mass during its transition to the rigid state and substantially preserving its shape by means of a transition section which contains a high temperature resistant electrical insulating material.

12. A process for producing graphitized carbon bodies from a green electrically conductive carbonaceous mass which evolves gases and which becomes rigid upon being heated, said green carbonaceous mass having an A.D. of at least 1.4 g./cc. which comprises:

(A) substantially continuously and mechanically forcing said green carbonaceous mass into and through baking and graphitizing zones wherein said green mass is resistively heated and rendered substantially rigid and self-supporting by the passage of current therethrough, said current being made to flow by applying a voltage across the moving mass by means of electrical conductors at least one of which is in direct contact with a green portion of said moving mass;

(B) maintaining said moving mass under a substantial pressure during its transition from the green to rigid state, said pressure being maintained by a restraining force excited upon the rigid mass, which restraining force tends to oppose the axial movement of the mass as it is being processed, said restraining force being at least equal to that necessary to maintain the structural integrity of the carbonaceous mass during the time it is heated from the green state to the rigid state and while the gases are evolved; and
(C) supporting said moving carbonaceous mass during its transition to the rigid state and substantially preserving its shape by means of a transition section which contains a high temperature resistant electrical insulating material.

13. A process for producing graphite bodies from a green electrically conductive carbonaceous mass which evolves gases and which becomes rigid upon being heated, said green carbonaceous mass having an A.D. of at least 1.4 g./cc. which comprises:
(A) substantially continuously and mechanically forcing said green carbonaceous mass into and through a baking zone wherein said green mass is resistively heated and rendered substantially rigid and self-supporting by the passage of current therethrough, said current being made to flow by applying a voltage across the moving mass by means of electrical conductors at least one of which is in direct contact with a green portion of said moving mass;
(B) maintaining said moving mass under a substantial pressure during its transition from the green to rigid state, said pressure being maintained by a restraining force excited upon the rigid mass, which restraining force tends to oppose the axial movement of the mass as it is being processed, said restraining force being at least equal to that necessary to maintain the structural integrity of the carbonaceous mass during the time it is heated from the green state to the rigid state and while the gases are evolved;
(C) supporting said moving carbonaceous mass during its transition to the rigid state and substantially preserving its shape by means of a transition section which contains a high temperature resistant electrical insulating material; and
(D) additionally heating said rigid mass and graphitizing same while it is substantially continuously moving, by the passage of current therethrough, said current being made to flow by applying a voltage across said rigid mass by means of electrical conductors, at least one of which is in direct contact with said moving rigid mass.

14. A process according to claim 13 wherein the same current is employed to graphitize the rigid mass as is employed to bake the green carbonaceous mass, said current being made to flow by applying a voltage across the moving mass by means of electrical conductors, one of which is in direct contact with the green portion and the other of which is in direct contact with the graphitized portion of the moving mass.

15. A process for producing graphite bodies having an A.D. between about 1.35 and about 1.90 g./cc. from a green electrically conductive carbonaceous mass which evolves gases and which becomes rigid upon being heated, said green composition having an A.D. of between about 1.4 and about 2.0 g./cc. which comprises:
(A) substantially continuously and mechanically forcing said green carbonaceous mass into and through a baking zone wherein said green mass is resistively heated and rendered substantially rigid and self-supporting by the passage of current therethrough, said current being made to flow by applying a voltage across the moving mass by means of electrical conductors at least one of which is in direct contact with a green portion of said moving mass;
(B) maintaining said moving mass under a substantial pressure during its transition from the green to rigid state, said pressure being maintained by a restraining force equivalent to at least 50 pounds per square inch of cross-sectional area excited upon the rigid mass, which restraining force tends to oppose the axial movement of the mass as it is being processed, said restraining force also being at least equal to that necessary to maintain the structural integrity of the carbonaceous mass during the time it is heated from the green state to the rigid state and while the gases are evolved;
(C) supporting said moving carbonaceous mass during its transition to the rigid state and substantially preserving its shape by means of a transition section which contains a high temperature resistant electrical insulating material; and
(D) additionally heating said rigid mass and graphitizing same while it is substantially continuously moving, by the passage of current therethrough, said current being made to flow by applying a voltage across said rigid mass by means of electrical conductors, at least one of which is in direct contact with said moving rigid mass.

16. An apparatus for producing baked carbon bodies from a green electrically conductive carbonaceous mass which evolves gases and which becomes rigid upon being heated, said green carbonaceous mass having an A.D. of at least 1.4 g./cc., which comprises means for substantially continuously and mechanically forcing green carbonaceous mass into and through the apparatus, means for resistively heating the green mass while it is moving substantially continuously to render it substantially rigid and self-supporting, said heating means comprising electrical conductors at least one of which is in direct contact with said green carbonaceous mass and which conductors are adapted to include the moving carbonaceous mass as a resistance element and to apply a voltage across same and to cause a current to flow therethrough, means containing a high temperature resistant electrical insulating material for supporting said green carbonaceous mass while it is moving and during its transition to the rigid state, said supporting means being a system which surrounds and physically contacts the green carbonaceous mass between the point that voltage is applied across same and the point that said mass becomes rigid and self-supporting, means for permitting the escape of the gases from the green mass when it is heated, and means for maintaining said carbonaceous mass under a substantial pressure during its transition from the green to rigid state, said means including a restraining member exerting a reverse axial thrust excited upon the substantially continuously moving rigid mass, said restraining member tending to oppose the forward axial movement of the rigid mass as it is being processed, and said restraining member exerting a force at least equal to that necessary to maintain the structural integrity of the carbonaceous mass during the time it is heated from the green state to the rigid state and while the gases are evolved.

17. An apparatus for applying electrothermal energy to a green electrically conductive composition which becomes rigid upon being heated, which comprises means for substantially continuously and mechanically forcing said green composition into and through the apparatus, means for resistively heating the green composition while it is moving substantially continuously to render it substantially rigid and self-supporting, said heating means comprising electrical conductors at least one of which is in direct contact with said green conductive composition and which conductors are adapted to include the moving composition as a resistance element and to apply a voltage across same and to cause a current to flow therethrough, means containing a high temperature resistant electrical insulating material for supporting said green conductive composition while it is moving and during its transition to the rigid state, said supporting means being a system which surrounds and physically contacts the green conductive composition between the point that voltage is applied across same and the point that said composition becomes rigid and self-supporting, and means for maintaining said conductive composition under a substantial pressure during its transition from the green to rigid state, said means including a restraining member exerting a reverse axial thrust excited upon the substantially continuously moving rigid composition, said restraining member tending to oppose the forward axial movement of the rigid composition as it is being processed, and said restraining member exerting a force at least equal to that necessary to maintain the structural integrity of the conductive composition during the time it is heated from the green state to the rigid state.

18. An apparatus according to claim 17 wherein the electrical conductors are adapted to cause current to flow through the green conductive composition in a substantially transverse direction.

19. An apparatus according to claim 17 wherein the electrical conductors are adapted to cause current to flow through the green conductive composition in a substantially axial direction.

20. An apparatus according to claim 17 wherein the electrical conductors apply voltage to the conductive composition at a plurality of contacts.

21. An apparatus according to claim 17 wherein the electrical conductor which is adapted to heat the green conductive composition by causing current to flow therethrough while it is substantially continuously moving comprises a segmented power plate surrounding the perimeter of the green conductive composition, the segments of which are adapted to provide varying voltages to said composition at a plurality of contacts.

22. An apparatus according to claim 17 comprising means for cooling the heated rigid composition while it is substantially continuously moving, and means for preventing oxidation of the composition while it is being heated and until it is cooled.

23. An apparatus for producing graphite bodies from a green electrically conductive carbonaceous mass which evolves gases and which becomes rigid upon being heated, said green carbonaceous mass having an A.D. of at least 1.4 g./cc., which comprises means for substantially continuously and mechanically forcing said green carbonaceous mass into and through the apparatus, means for resistively heating the green mass while it is moving substantially continuously to render it substantially rigid and self-supporting, said heating means comprising electrical conductors at least one of which is in direct contact with said green carbonaceous mass and which conductors are adapted to include the moving carbonaceous mass as a resistance element and to apply a voltage across same and to cause a current to flow therethrough, means containing a high temperature resistant electrical insulating material for supporting said green carbonaceous mass while it is moving and during its transition to the rigid state, said supporting means being a system which surrounds and physically contacts the green carbonaceous mass between the point that voltage is applied across same and the point that said mass becomes rigid and self-supporting, means for permitting the escape of the gases from the green mass when it is heated, means for maintaining said carbonaceous mass under a substantial pressure during its transition from the green to rigid state, said means including a restraining member exerting a reverse axial thrust excited upon the substantially continuously moving rigid mass, said restraining member tending to oppose the forward axial movement of the rigid mass as it is being processed, said restraining member exerting a force at least equal to that necessary to maintain the structural integrity of the carbonaceous mass during the time it is heated from the green state to the rigid state and while the gases are evolved, and means for additionally heating said rigid mass and to graphitize same while it is continuously moving, said means comprising electrical conductors, at least one of which is in direct contact with said rigid mass, adapted to include said rigid mass as a resistance element and to apply a voltage across same and to cause a current to flow therethrough.

24. An apparatus according to claim 23 comprising means for cooling the graphitized mass while it is substantially continuously moving, and means for preventing oxidation of the mass while it is being baked and graphitized and until it is cooled.

25. A baked carbon body produced according to the process of claim 4.

26. A graphite body produced according to the process of claim 12.

References Cited by the Examiner

UNITED STATES PATENTS

| | | | |
|---|---|---|---|
| 2,372,773 | 4/1945 | Fiechter | 264—29 XR |
| 3,001,237 | 9/1961 | Balaguer | 264—29 XR |

FOREIGN PATENTS 517,798  2/1940  Great Britain.

ROBERT F. WHITE, *Primary Examiner.*

J. A. FINLAYSON, *Assistant Examiner.*